US011849371B2

(12) United States Patent
Gummadi et al.

(10) Patent No.: US 11,849,371 B2
(45) Date of Patent: Dec. 19, 2023

(54) SYSTEM AND METHODS FOR LOW LATENCY POSITIONING USING FAST UPLINK SIGNALING

(71) Applicant: QUALCOMM Incorporated, San Diego, CA (US)

(72) Inventors: Bapineedu Chowdary Gummadi, Hyderabad (IN); Stephen William Edge, Escondido, CA (US); Hem Agnihotri, Benares (IN); Amit Priyadarshi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/404,874

(22) Filed: Aug. 17, 2021

(65) Prior Publication Data

US 2022/0060853 A1 Feb. 24, 2022

Related U.S. Application Data

(60) Provisional application No. 63/069,433, filed on Aug. 24, 2020.

(51) Int. Cl.
*H04W 4/02* (2018.01)
*H04W 72/23* (2023.01)
*H04W 4/029* (2018.01)

(52) U.S. Cl.
CPC ........... *H04W 4/029* (2018.02); *H04W 4/025* (2013.01); *H04W 72/23* (2023.01)

(58) Field of Classification Search
CPC ...... H04W 4/029; H04W 4/025; H04W 72/23
(Continued)

(56) References Cited

U.S. PATENT DOCUMENTS 10,051,422 B1 * 8/2018 Kumar ..................... G01S 5/14
2012/0083221 A1 4/2012 Ranta-Aho et al.
(Continued)

FOREIGN PATENT DOCUMENTS

WO WO-2020093358 A1 5/2020

OTHER PUBLICATIONS

International Search Report and Written Opinion—PCT/US2021/046477—ISA/EPO—dated Dec. 10, 2021.
(Continued)

*Primary Examiner* — Ted M Wang
(74) *Attorney, Agent, or Firm* — QUALCOMM Incorporated

(57) ABSTRACT

During a positioning session, a user equipment (UE) is provided with an early uplink grant to respond to a request for location service information from a location server. The location service information, for example, may be a request for positioning capabilities, a request for positioning measurements or a position estimate, and may be a request for a single, periodic or triggered location information. The early uplink grant may be requested by the UE prior to needing the uplink grant, e.g., before the positioning measurements have been completed. The location server may instigate the early uplink grant, e.g., at or near the same time that the location server sends the request for information to the UE. The early uplink grant may be used, e.g., during high priority or emergency related positioning sessions, in order to reduce delay in the UE providing a response to the request for location information.

38 Claims, 9 Drawing Sheets

(58) Field of Classification Search
USPC .................................................. 455/456.1
See application file for complete search history.

(56) References Cited

U.S. PATENT DOCUMENTS

2013/0100938 A1* 4/2013 Kwon ................ H04L 27/2655
370/336
2019/0044649 A1* 2/2019 Kim ......................... H04L 1/00

OTHER PUBLICATIONS

Nokia, et al., "Views on Potential Positioning Enhancements", 3GPP Draft, 3GPP TSG RAN WG1 #102-e, R1-2006429, 3rd Generation Partnership Project (3GPP), Mobile Competence Centre, 650, Route Des Lucioles, F-06921 Sophia-Antipolis Cedex, France, vol. RAN WG1, No. Shanghai, Aug. 7, 2020 (Aug. 7, 2020), XP051915352, 7 Pages, Retrieved from the Internet: URL: https://ftp.3gpp.org/tsg_ran/WG1_RL1/TSGR1_102-e/Docs/R1-2006429.zip. R1-2006429 enhancements.docx [retrieved on Aug. 7, 2020] paragraph [02. 6].

* cited by examiner

SYSTEM AND METHODS FOR LOW LATENCY POSITIONING USING FAST UPLINK SIGNALING

CLAIM OF PRIORITY UNDER 35 U.S.C. § 119

This application claims under 35 USC § 119 the benefit of and priority to U.S. Provisional Application No. 63/069,433, filed Aug. 24, 2020, and entitled "SYSTEM AND METHODS FOR LOW LATENCY POSITIONING USING FAST UPLINK SIGNALING," which is assigned to the assignee hereof and is incorporated herein by reference in its entirety.

BACKGROUND OF THE DISCLOSURE

Field of the Disclosure

The present disclosure relates generally to communication, and more specifically to techniques for supporting location services for user equipments (UEs) served by a Fifth Generation (5G) wireless network.

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) New Radio (NR) standard calls for higher data transfer speeds, greater numbers of connections, and better coverage, among other improvements. The 5G NR, according to the Next Generation Mobile Networks Alliance, is designed to provide data rates of several tens of megabits per second to each of tens of thousands of users, with 1 gigabit per second to tens of workers on an office floor.

For some applications, it may be useful or essential to be able to obtain a location of a mobile device through a wireless communication system with extremely low latency. Examples of such applications can include location in association with an emergency call from a mobile device, applications involving Industrial Internet of Things (IIoT) such in an automated factory or warehouse, and/or applications involving automated devices such as driverless cars or unmanned aerial vehicles (UAVs).

SUMMARY

During a positioning session, a user equipment (UE) is provided with an early uplink grant to respond to a request for location service information from a location server. The location service information, for example, may be a request for positioning capabilities, a request for positioning measurements or a position estimate, and may be a request for a single, periodic, or triggered location information. The early uplink grant may be requested by the UE prior to needing the uplink grant, e.g., before the positioning measurements have been completed. The location server may instigate the early uplink grant, e.g., at or near the same time that the location server sends the request for information to the UE. The early uplink grant may be used, e.g., during high priority or emergency related positioning sessions, in order to reduce delay in the UE providing a response to the request for location information.

In one implementation, a method performed by a user equipment (UE) for supporting location services for the UE, includes receiving a request for location information from a location server; receiving an uplink grant from a base station before the UE is ready to send the location information to the location server; and sending the location information to the location server using the uplink grant.

In one implementation, a user equipment (UE) configured for supporting location services for the UE, comprising: a wireless transceiver configured to communicate with other entities in a wireless network; at least one memory; and at least one processor coupled to the wireless transceiver and the at least one memory and configured to: receive, via the wireless transceiver, a request for location information from a location server; receive, via the wireless transceiver, an uplink grant from a base station before the UE is ready to send the location information to the location server; and send, via the wireless transceiver, the location information to the location server using the uplink grant.

In one implementation, a user equipment (UE) configured for supporting location services for the UE, comprising: means for receiving a request for location information from a location server; means for receiving an uplink grant from a base station before the UE is ready to send the location information to the location server; and means for sending the location information to the location server using the uplink grant.

In one implementation, a non-transitory computer-readable storage medium including program code stored thereon, the program code is operable to configure at least one processor in a user equipment (UE) for supporting location services for the UE, the program code comprising instructions to: receive a request for location information from a location server; receive an uplink grant from a base station before the UE is ready to send the location information to the location server; and send the location information to the location server using the uplink grant.

In one implementation, a method performed by a location server for supporting location services for a user equipment (UE), includes sending a request to the UE for information related to the location services; sending a message to a base station to instigate an uplink grant for the UE to respond to the request; and receiving a response to the request from the UE sent by the UE using the uplink grant.

In one implementation, a location server configured for supporting location services for a user equipment (UE), comprising: an external interface configured to communicate with other entities in a wireless network; at least one memory; and at least one processor coupled to the external interface and the at least one memory and configured to: send, via the external interface, a request to the UE for information related to the location services; send, via the external interface, a message to a base station to instigate an uplink grant for the UE to respond to the request; and receive, via the external interface, a response to the request from the UE sent by the UE using the uplink grant.

In one implementation, a location server configured for supporting location services for a user equipment (UE), comprising: means for sending a request to the UE for information related to the location services; means for sending a message to a base station to instigate an uplink grant for the UE to respond to the request; and means for receiving a response to the request from the UE sent by the UE using the uplink grant.

In one implementation, a non-transitory computer-readable storage medium including program code stored thereon, the program code is operable to configure at least one processor in a location server for supporting location services for a user equipment (UE), the program code comprising instructions to: send a request to the UE for information related to the location services; send a message to a base station to instigate an uplink grant for the UE to respond to the request; and receive a response to the request from the UE sent by the UE using the uplink grant.

In one implementation, a method performed by a base station for supporting location services for a user equipment (UE), includes receiving a message to instigate an uplink grant for the UE to respond to a request from a location server for information related to the location services; sending an uplink grant to the UE before the UE is ready to send a response to the request for information related to the location services; and receiving a response to the request for information sent from the UE using the uplink grant and forward to the location server.

In one implementation, a base station configured for supporting location services for a user equipment (UE), comprising: an external interface configured to communicate with other entities in a wireless network; at least one memory; and at least one processor coupled to the external interface and the at least one memory and configured to: receive, via the external interface, a message to instigate an uplink grant for the UE to respond to a request from a location server for information related to the location services; send, via the external interface, an uplink grant to the UE before the UE is ready to send a response to the request for information related to the location services; and receive, via the external interface, a response to the request for information sent from the UE using the uplink grant and forward to the location server.

In one implementation, a base station configured for supporting location services for a user equipment (UE), comprising: means for receiving a message to instigate an uplink grant for the UE to respond to a request from a location server for information related to the location services; means for sending an uplink grant to the UE before the UE is ready to send a response to the request for information related to the location services; and means for receiving a response to the request for information sent from the UE using the uplink grant and forward to the location server.

In one implementation, a non-transitory computer-readable storage medium including program code stored thereon, the program code is operable to configure at least one processor in a base station for supporting location services for a user equipment (UE), the program code comprising instructions to: receive a message to instigate an uplink grant for the UE to respond to a request from a location server for information related to the location services; send an uplink grant to the UE before the UE is ready to send a response to the request for information related to the location services; and receive a response to the request for information sent from the UE using the uplink grant and forward to the location server.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
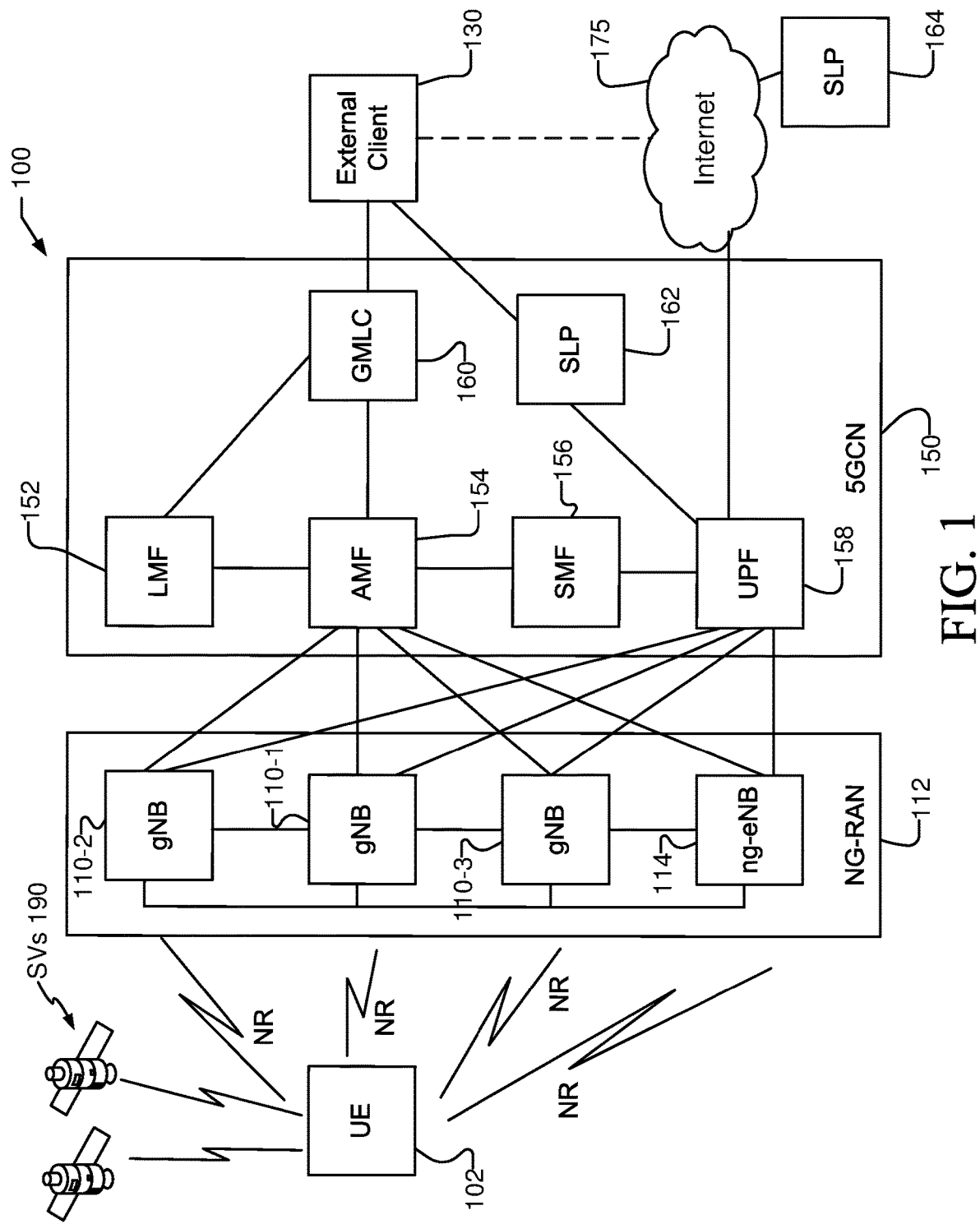
FIG. 1 illustrates a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1, 110-2, 110-3 of a base station are shown in FIG. 1. A reference to a base station 110 then refers to any of base stations 110-1, 110-2, 110-3.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE, e.g. for the assisted GNSS (A-GNSS), downlink time difference of arrival (DL-TDOA), AoD, Multi-cell RTT (also referred to as multi-RTT), and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

It is noted that the terms "location measurements", "position measurements" and "positioning measurements" can be synonymous and used interchangeably. Likewise, the terms "location estimate", "position estimate" and "positioning estimate" can be synonymous and used interchangeably.

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., DL-TDOA, AoD, Multi-RTT, etc.).

In a UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., DL-TDOA, AoD, Multi-RTT, etc.).

In another standalone mode of operation, a UE may make location related measurements without any positioning assistance data from an LS and may further compute a location or a change in location without any positioning assistance data from an LS. Position methods that may be used in a standalone mode include GPS and GNSS (e.g. if a UE obtains satellite orbital data from data broadcast by GPS and GNSS satellites themselves) as well as sensors.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, an LS and UE may exchange messages defined according to some positioning protocol in order to coordinate the determination of an estimated location. Possible positioning protocols may include, for example, the LTE Positioning Protocol (LPP) defined by 3GPP in 3GPP TS 37.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message An LS and a base station (e.g. an eNodeB for LTE access or a gNodeB for NR access) may exchange messages to enable the LS to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and an LS that is an E-SMLC. In the case of NR access, the NR Positioning Protocol A (NRPPa) defined in 3GPP TS 38.455 may be used to transfer such messages between a base station that is a gNB (gNodeB) and an LS that is an LMF.

During an emergency situation or in other mission critical scenarios or where very low latency is needed, when a positioning session is initiated, the Location Server (LS) should receive the UE measurements (e.g. GNSS pseudor-ange, RSTD, RxTx, RSRP) as quickly as possible. When the LS sends the LPP Request Information for measurements to the UE, the UE obtains the requested information, e.g., position measurements, and sends the requested information to the LS, e.g., using an uplink (UL) grant received from the base station. An UL grant can comprise a permission from a serving base station for a UE to send an UL message at a particular time or times using particular UL transmission resources (e.g. using a particular UL channel such as a physical uplink shared channel (PUSCH), a particular frequency, a particular frequency hopping sequence and/or particular resource blocks). If the UE does not already have an UL grant, which can happen in many cases, the UE has to send a request for the UL grant using a Scheduling Request (SR) that is sent to the base station. The base station must respond and provide the UL grant to the UE before the UE can provide the requested information to the LS. The process of sending a request for an UL grant and receiving the UL grant may take 10 s of milliseconds or up to a couple of seconds and, thus, may produce a significant delay in providing the positioning information to the LS.

The main factors for the delay can include network congestion, the presence of sleep cycles, or a poor signal that causes a Random Access Channel (RACH) used by a UE to request an UL grant to fail. For example, RACH failures can frequently occur because an initial RACH power is too low and the power has to be adjusted in several attempts to match a required signal quality.

Accordingly, to reduce the delay in a UE response to positioning requests, in some implementations, a location server may provide an indication to a serving base station that a positioning session has high priority, e.g., when the location server sends the request to the UE. The base station may process and send the UL grants upfront (i.e. in advance) to the UE, e.g., along with a request message from the location server or before the UE is prepared to respond to the request. The location server may decide when to recommend that the serving base station provide the UL grants upfront. For example, the location server may provide an indication of the need for an upfront UL grant in high priority cases, such as in emergency scenarios or where a location is required with very low latency (e.g. for an application for IIoT or for an automated UE). Accordingly, the UE may send the requested information to the location server without a need to wait for an UL grant from the base station, so the positioning can be performed quickly.

In some implementations, the location server may also request that the base station send multiple grants to the UE for repetitions (e.g., for periodic location requests), especially where there are poor signal conditions so that data (e.g. location measurements) sent by the UE will be received more quickly and more reliably. In some implementations, the location server may send the indication for the need for upfront grants, e.g., based on a priority of positioning or based on a response time requirement in a location Quality of Service (QoS) parameter, or the base station may make a decision (e.g., a number of repetitions) based on the UE's signal quality, which the base station may obtain through a UE measurement report or a UE mobility state that the base station obtains during a connection setup, a connection resume or connection re-establishment for the UE.

In some implementations, a UE may send a request for an UL grant before the UE is prepared to send a response to a positioning request from a location server. For example, the UE may send a request for an UL grant to the base station before the UE has completed (or started) requested positioning measurements. For periodic or triggered positioning, for example, the UE may enter a connected state a few seconds before the UE expects to send measurements and may then obtain the UL grants from the base station before the UE is ready to send the positioning measurements, which may assist very low latency Industrial Internet of Things (IIoT) positioning where maximum end-to-end latency may be 10-100 ms.

FIG. 1 shows an architecture based on a non-roaming 5G NR network to support UE positioning using an upfront UL grant as discussed herein. FIG. 1 illustrates a communication system 100 that comprises a UE 102, which is sometimes referred to herein as a "target UE", since UE 102 may be the target of a location request. FIG. 1 also shows components of a Fifth Generation (5G) network comprising a Next Generation Radio Access Network (NG-RAN) 112, which includes base stations (BSs) sometimes referred to as New Radio (NR) NodeBs or gNBs 110-1, 110-2, 110-3, and a ng-eNB 114, and a 5G Core Network (5GCN) 150 that is in communication with an external client 130. A 5G network may also be referred to as a New Radio (NR) network; NG-RAN 112 may be referred to as an NR RAN or a 5G RAN; and 5GCN 150 may be referred to as a Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1 shows a serving gNB 110-1 for the target UE 102 and neighbor gNBs 110-2, 110-3, and ng-eNB 114. A neighbor gNB may be any gNB which is able to receive and measure uplink (UL) signals transmitted by the target UE 102 and/or is able to transmit a downlink (DL) reference signal (RS), e.g., positioning reference signals (PRS), that can be received and measured by the target UE 102.

Entities in the NG-RAN 112 which transmit DL PRSs to be measured by a target UE 102 for a particular location session are referred to generically as "Transmission Points" (TPs) and can include one or more of the serving gNB 110-1, and neighbor gNBs 110-2, 110-3, and ng-eNB 114.

Entities in the NG-RAN 112 which receive and measure UL signals (e.g. an RS) transmitted by a target UE 102 for a particular location session are referred to generically as "Reception Points" (RPs) and can include one or more of the serving gNB 110-1, and neighbor gNBs 110-2, 110-3, and ng-eNB 114.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger or smaller number of SVs 190, gNBs 110-1-110-2, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 102 may communicate with an Access Network (AN), as opposed to an NG-RAN, and accordingly, component 112 is sometimes referred to herein as an AN or as a RAN, denoted by the term "RAN", "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The target UE 102, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. The target UE 102 may be a stand-alone device or may be embedded in another device, e.g., a factory tool, that is to be monitored or tracked. Moreover, UE 102 may correspond to a smart watch, digital glasses, fitness monitor, smart car, smart appliance, cellphone, smartphone, laptop, tablet, PDA, tracking device, control device or some other portable or moveable device. The UE 102 may include a single entity or may include multiple entities such as in a personal area network where a user may employ audio, video and/or data I/O devices and/or body sensors and a separate wireline or wireless modem. Typically, though not necessarily, the UE 102 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (e.g. via elements of 5GCN 150 not shown in FIG. 1, or possibly via a Gateway Mobile Location Center (GMLC) 160, and/or allow the external client 130 to receive location information regarding the UE 102 (e.g., via the GMLC 160).

The UE 102 may enter a connected state with a wireless communication network that may include the NG-RAN 112. In one example, the UE 102 may communicate with a cellular communication network by transmitting wireless signals to, or receiving wireless signals from a cellular transceiver, in the NG-RAN 112, such as a gNB 110-1. A transceiver provides user and control planes protocol terminations toward the UE 102 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 102 may have circuitry and processing resources capable of obtaining location related measurements. Location related measurements obtained by UE 102 may include measurements of signals received from satellite vehicles (SVs) 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs). UE 102 or gNB 110-1 to which UE 102 may send the measurements, may then obtain a location estimate for the UE 102 based on these location related measurements using any one of several position methods such as, for example, GNSS, Assisted GNSS (A-GNSS), Advanced Forward Link Trilateration (AFLT), Observed Time Difference Of Arrival (OTDOA), DL-TDOA, WLAN (also referred to as WiFi) positioning, or Enhanced Cell ID (ECID) or combinations thereof. In some of these techniques (e.g. A-GNSS, AFLT, OTDOA and DL-TDOA), pseudoranges or timing differences may be measured at UE 102 relative to three or more terrestrial transmitters (e.g. gNBs) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 102.

The location server in FIG. 1 may correspond to, e.g., Location Management Function (LMF) 152 or Secure User Plane Location (SUPL) Location Platform (SLP) 162, may be capable of providing positioning assistance data to UE 102 including, for example, information regarding signals to be measured (e.g., expected signal timing, signal coding, signal frequencies, signal Doppler), locations and identities of terrestrial transmitters (e.g. gNBs) and/or signal, timing and orbital information for GNSS SVs to facilitate positioning techniques such as A-GNSS, AFLT, OTDOA, DL-TDOA and ECID. The facilitation may include improving signal acquisition and measurement accuracy by UE 102 and, in some cases, enabling UE 102 to compute its estimated location based on the location measurements. For example, a location server (e.g. LMF 152 or SLP 162) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB) such as transmission power and signal timing. A UE 102 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (RxTx), a reference signal time difference (RSTD), or a round trip signal propagation time (RTT) between UE 102 and a cellular transceiver (e.g. a gNB) or a local transceiver (e.g. a WiFi access point (AP)). A UE 102 may use these measurements together with assistance data (e.g. terrestrial almanac data or GNSS satellite data such as GNSS Almanac and/or GNSS Ephemeris information) received from a location server (e.g. LMF 152 or SLP 162) or broadcast by a base station (e.g. a gNB 110-1-110-2) in NG-RAN 112 to determine a location for UE 102.

In some implementations, network entities are used to assist in location of a target UE 102. For example, entities in a network such as gNBs 110-1-110-2 may measure UL signals transmitted by UE 102. The UL signals may include or comprise UL reference signals such as UL positioning reference signals (PRSs) or UL Sounding Reference Signals (SRSs). The entities obtaining the location measurements (e.g. gNBs 110-1-110-2) may then transfer the location measurements to the UE 102, which may use the measurements to determine RTDs for multiple transceiver pairs. Examples of location measurements that may use UL signals can include an RSSI, RSRP, RSRQ, TOA, RxTx, AOA and RTT.

An estimate of a location of the UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geographically or in civic form) within which the UE 102 is expected to be located with some probability or confidence level (e.g., 67%, 95%, etc.). A location of the UE 102 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. The location may be expressed as an absolute location estimate for the UE, such as location coordinates or address, or as a relative location estimate for the UE, such as a distance and direction from a previous location estimate or from a known absolute location. The location of the UE may include a linear velocity, an angular velocity, a linear acceleration, an angular acceleration, an angular orientation for the UE, e.g., the orientation of the UE relative to a fixed global or local coordinate system, an identification of a trigger event for locating the UE, or some combination of these. For example, trigger events may include an area event, a motion event or a velocity event. An area event, for example, may be the UE moving into a defined area, moving out of the area and/or remaining in the area. A motion event, for example, may include movement of the UE by a threshold straight line distance or threshold distance along a UE trajectory. A velocity event, for example, may include the UE attaining a minimum or maximum velocity, a threshold increase and/or decrease of velocity, and/or a threshold change in direction. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs in NG-RAN 112 may be connected to one another, e.g., directly as shown in FIG. 1 or indirectly via other gNBs 110-1-110-2. Access to the 5G network is provided to UE 102 via wireless communication between the UE 102 and one or more of the gNBs 110-1-110-2, which may provide wireless communication access to the 5GCN 150 on behalf of the UE 102 using 5G (e.g. NR). In FIG. 1, the serving gNB for UE 102 is assumed to be gNB 110-1, although other gNBs (e.g. gNB 110-2, 110-3, or ng-eNB 114) may act as a serving gNB if UE 102 moves to another location or may act as a secondary gNB to provide additional throughout and bandwidth to UE 102. Some gNBs in FIG. 1 (e.g. gNB 110-2, 110-3, or ng-eNB 114) may be configured to function as positioning-only beacons which may transmit signals (e.g. directional PRS) to assist positioning of UE 102 but may not receive signals from UE 102 or from other UEs.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved Node Bs (eNBs) supporting LTE, or other types of base stations or access points. As an example, NG-RAN 112 may include one or more next generation eNBs (ng-eNBs), not shown, which provide LTE wireless access to UE 102 and may connect to entities in 5GCN 150 such as AMF 154.

The gNBs 110-1, 110-2, 110-3, and ng-eNB 114 can communicate with the Access and Mobility Management Function (AMF) 154, which, for positioning functionality, may communicate with a Location Management Function (LMF) 152. The AMF 154 may support mobility of the UE 102, including cell change and handover and may participate in supporting a signaling connection to the UE 102 and possibly helping establish and release Protocol Data Unit (PDU) sessions for UE 102 supported by the UPF 158. Other functions of AMF 154 may include: termination of a control plane (CP) interface from NG-RAN 112; termination of Non-Access Stratum (NAS) signaling connections from UEs such as UE 102, NAS ciphering and integrity protection; registration management; connection management; reachability management; mobility management; access authentication and authorization.

The gNB 110-1 may support positioning of the UE 102 when UE 102 accesses the NG-RAN 112. The gNB 110-1 may also process location service requests for the UE 102, e.g., received directly or indirectly from the GMLC 160. In some embodiments, a node/system that implements the gNB 110-1 may additionally or alternatively implement other types of location-support modules, such as an Enhanced Serving Mobile Location Center (E-SMLC) or a Secure User Plane Location (SUPL) Location Platform (SLP) 162. It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The GMLC 160 may support a location request for the UE 102 received from an external client 130 and may forward such a location request to a serving AMF 154 for UE 102. The AMF 154 may then forward the location request to either gNB 110-1 or LMF 152 which may obtain one or more location estimates for UE 102 (e.g. according to the request from external client 130) and may return the location estimate(s) to AMF 154, which may return the location estimate(s) to external client 130 via GMLC 160. GMLC 160 may contain subscription information for an external client 130 and may authenticate and authorize a location request for UE 102 from external client 130. GMLC 160 may further initiate a location session for UE 102 by sending a location request for UE 102 to AMF 154 and may include in the location request an identity for UE 102 and the type of location being requested (e.g. such as a current location or a sequence of periodic or triggered locations).

As further illustrated in FIG. 1, an external client 130 may be connected to the core network 150 via the GMLC 160 and/or the SLP 162. The external client 130 may optionally be connected to the core network 150 and/or to an SLP 164, that is external to 5GCN 150, via the Internet 175. The external client 130 may be a server, a web server, or a user device, such as a personal computer, a UE, etc.

The LMF 152 and the gNB 110-1 may communicate using a New Radio Positioning Protocol A (NRPPa). NRPPa may be defined in 3GPP TS 38.455, with NRPPa messages being transferred between the gNB 110-1 and the LMF 152. Further, the LMF 152 and UE 102 may communicate using the LTE Positioning Protocol (LPP) defined in 3GPP TS 37.355, where LPP messages are transferred between the UE 102 and the LMF 152 via the serving AMF 154 and the serving gNB 110-1 for UE 102. For example, LPP messages may be transferred between the AMF 154 and the UE 102 using a 5G Non-Access Stratum (NAS) protocol. The LPP protocol may be used to support positioning of UE 102 using UE assisted and/or UE based position methods such as Assisted GNSS (A-GNSS), Real Time Kinematic (RTK), Wireless Local Area Network (WLAN), Observed Time Difference of Arrival (OTDOA), DL-TDOA, Round-Trip Time (RTT), multi-RTT, and/or Enhanced Cell Identity (ECID). The NRPPa protocol may be used to support positioning of UE 102 using network based position methods such as ECID (when used with measurements obtained by or received from a gNB 110-1, 110-2, 110-3, or ng-eNB 114) and/or may be used by LMF 152 to obtain location related information from gNBs such as parameters defining positioning reference signal (PRS) transmission from gNBs for support of DL-TDOA.

GNBs 110-1, 110-2, 110-3, or ng-eNB 114 may communicate with AMF 154 using a Next Generation Application Protocol (NGAP), e.g. as defined in 3GPP Technical Specification (TS) 38.413, or using a location specific protocol (referred to here as LSP1) transported by NGAP. NGAP or the LSP1 may enable AMF 154 to request a location of a target UE 102 from a gNB 110-1 for target UE 102 and may enable gNB 110-1 to return a location for UE 102 to the AMF 154.

GNBs 110-1, 110-2, 110-3, or ng-eNB 114 may communicate with one another using an Xn Application Protocol (XnAP), e.g. as defined in 3GPP TS 38.423, or using a location specific protocol (referred to here as LSP2) transported by XnAP, which may be different to LSP1. XnAP or LSP2 may allow one gNB to request another gNB to obtain UL location measurements for a target UE and to return the UL location measurements. XnAP or LSP2 may also enable a gNB to request another gNB to transmit a downlink (DL) RS or PRS to enable a target UE 102 to obtain DL location measurements of the transmitted DL RS or PRS. In some embodiments, LSP2 (when used) may be same as or an extension to NRPPa.

A gNB (e.g. gNB 110-1) may communicate with a target UE 102 using a Radio Resource Control (RRC) protocol, e.g. as defined in 3GPP TS 38.331, or using a location specific protocol (referred to here as LSP3) transported by RRC, which may be different to LSP1 and LSP2. RRC or LSP3 may allow a gNB (e.g. gNB 110-1) to request location measurements from the target UE 102 of DL RSs or DL PRSs transmitted by the gNB 110-1 and/or by other gNBs 110-2, 110-3, or ng-eNB 114 and to return some or all of the location measurements. RRC or LSP3 may also enable a gNB (e.g. gNB 110-1) to request the target UE 102 to transmit an UL RS or PRS to enable the gNB 110-1 or other gNBs 110-2, 110-3, or ng-eNB 114 to obtain UL location measurements of the transmitted UL RS or PRS. In some embodiments, LSP3 (when used) may be same as or an extension to LPP.

With a UE assisted position method, UE 102 may obtain location measurements (e.g. measurements of RSSI, RxTx, RTT, Multi-RTT, AoA, RSTD, RSRP and/or RSRQ for gNBs 110-1, 110-2, 110-3, or ng-eNB 114 or WLAN APs, or measurements of GNSS pseudorange, code phase and/or carrier phase for SVs 190) and send the measurements to an entity performing a location server function, e.g., LMF 152, or SLP 162, for computation of a location estimate for UE 102. With a UE based position method, UE 102 may obtain location measurements (e.g. which may be the same as or similar to location measurements for a UE assisted position method) and may compute a location of UE 102 (e.g. with the help of assistance data received from a location server such as LMF 152 or SLP 162). With a network based position method, one or more base stations (e.g. gNBs 110-1-110-2) or APs may obtain location measurements (e.g. measurements of RSSI, RTT, AoD, RSRP, RSRQ, RxTx or TOA for signals transmitted by UE 102) and/or may receive measurements obtained by UE 102, and may send the measurements to a location server, e.g., LMF 152, for computation of a location estimate for UE 102.

Information provided by the gNBs 110-2, 110-3, or ng-eNB 114 to the gNB 110-1 using XnAP or LSP2 may include timing and configuration information for PRS transmission and location coordinates of the gNBs 110-2, 110-3, or ng-eNB 114. The gNB 110-1 can then provide some or all of this information to the UE 102 as assistance data in an RRC or LSP3 message. An RRC message sent from gNB 110-1 to UE 102 may include an embedded LSP3 message (e.g. an LPP message) in some implementations.

An RRC or LSP3 message sent from the gNB 110-1 to the UE 102 may instruct the UE 102 to do any of a variety of things, depending on desired functionality. For example, the RRC or LSP3 message could contain an instruction for the UE 102 to obtain measurements for GNSS (or A-GNSS), WLAN, and/or DL-TDOA (or some other position method) or to transmit uplink (UL) signals, such as Positioning Reference Signals, Sounding Reference Signals, or both. In the case of DL-TDOA, the RRC or LSP3 message may instruct the UE 102 to obtain one or more measurements (e.g. RSTD measurements) of PRS signals transmitted within particular cells supported by particular gNBs. The UE 102 may use the measurements to determine the position of UE 102, e.g., using DL-TDOA.

A gNB in NG-RAN 112 may also broadcast positioning assistance data to UEs such as UE 102.

As illustrated, a Session Management Function (SMF) 156 connects the AMF 154 and the UPF 158. The SMF 156 may have the capability to control both a local and a central UPF within a PDU session. SMF 156 may manage the establishment, modification and release of PDU sessions for UE 102, perform IP address allocation and management for UE 102, act as a Dynamic Host Configuration Protocol (DHCP) server for UE 102, and select and control a UPF 158 on behalf of UE 102.

The User Plane Function (UPF) 158 may support voice and data bearers for UE 102 and may enable UE 102 voice and data access to other networks such as the Internet 175. UPF 158 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 158 may be connected to SLP 162 to enable support of location of UE 102 using SUPL. SLP 162 may be further connected to or accessible from external client 130.

It should be understood that while FIG. 1 shows a network architecture for a non-roaming UE, with suitable, well-known, changes, a corresponding network architecture may be provided for a roaming UE.

During a positioning session, in some situations, such during an emergency call, for mission critical scenarios or for applications for IIoT or automated UEs, it may be desirable for a location server (e.g. LMF 152 or SLP 162) to receive a response from the UE 102 to a positioning related request as quickly as possible. One source of delay found in conventional positioning processes is caused by delays in the UE 102 obtaining UL grants from a base station that are necessary to send requested positioning information to the location server 152/162. For example, if the UE 102 does not already have an UL grant from the base station, the UE 102 will send a request for the grant using a Scheduling Request (SR) and the base station will respond with the UL grants. The process of obtaining the necessary UL grants from the base station may require up to a few seconds, which is a significant delay, particularly in emergency or very low latency situations.

To reduce the delay in responding to a location server 152/162 with requested positioning related information, the location server 152/162 can provide an indication to the serving base station that a positioning session has high priority and that the UE 102 should be provided with UL grants in order to respond to a request. For example, the location server 152/162 may send the indication to the base station, e.g., when the location server 152/162 sends the request to the UE 102. The base station may process the grant and send the UL grants to the UE before the UE is ready to respond to the request. Thus, when the UE is ready to respond to the request, the UE may send the information using the UL grant that has already been received. The UE, accordingly, does not need to request and await the UL grant.

Figure 2:
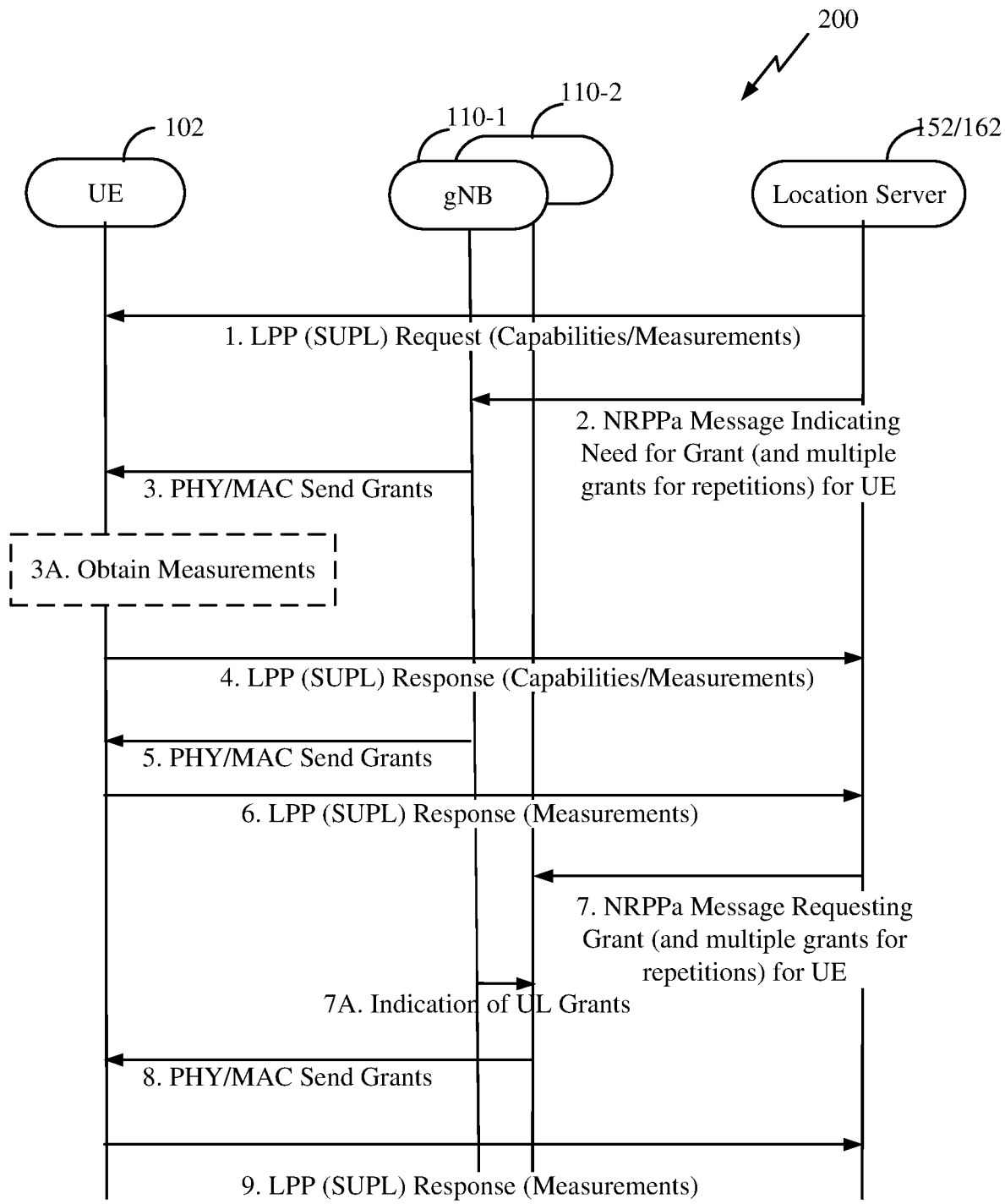
FIG. 2 shows a signaling flow that illustrates various messages sent between components of the communication system during a location session in which an early uplink grant is instigated by a location server.

FIG. 2 shows a signaling flow 200 that illustrates various messages sent between components of the communication system 100 depicted in FIG. 1, during a location session between the UE 102 and the location server 152/162 in which location server 152/162 instigates the UL grant process on behalf of the UE 102. While the flow diagram is discussed, for ease of illustration, in relation to a 5G NR wireless access using gNBs 110, signaling flows similar to FIG. 2 involving ng-eNBs 114 or eNBs rather than gNBs 110 will be readily apparent to those with ordinary skill in the art. Furthermore, it should be understood that the messages in signaling flow 200 are provided to illustrate a process of obtaining upfront UL grants for the UE 102 during a positioning session, and that additional messages and actions may be included in a positioning session. In the signaling flow 200, it is assumed that the UE 102 and location server 152/162 communicate using the LPP positioning protocol referred to earlier. The signaling flow 200 may be performed in control plane or user plane.

FIG. 2 illustrates a procedure in which the location server 152/162 provides an indication to the serving gNB 110-1 to provide one or more UL grants to the UE 102.

At stage 1 in FIG. 2, the location server 152/162 sends an LPP Request message to the UE 102 (e.g. via the AMF 154 and gNB 110-1). If the positioning process is performed in user plane, the request may be sent via SUPL (e.g. via the UPF 158 and gNB 110-1). The Request message, for example, may be a request for information related to positioning. For example, the Request message may be a request for positioning capabilities of the UE 102 or a request for location information, such as positioning measurements from the UE 102, e.g., for a UE-assisted positioning process, or a position estimate from the UE 102, e.g., for a UE based positioning process.

At stage 2, the location server 152/162 sends a message to the serving gNB 110-1 indicating that the gNB 110-1 should provide the UE 102 with UL grants in order for the UE 102 to respond to a location request. The message at stage 2, for example, may an NRPPa message, and may be sent at approximately the same time as the Request message in stage 1, e.g., before, after, or contemporaneously. In some implementations, prior to stage 2, the location server 152/162 may determine whether an upfront UL grant is appropriate, e.g., based on a priority level or a QoS of the positioning session with the UE 102. For example, the location server 152/162 may determine whether it is appropriate to recommend upfront UL grants from the gNB 110-1, e.g., based on the priority level or QoS of the UE positioning, such as emergency scenarios, and sends the message at stage 2 if appropriate. The message sent to the gNB 110-1 at stage 2, for example, may be an indication of the priority level and/or QoS for the UE positioning. The gNB 110-1 may determine if the priority level and/or QoS warrants an upfront UL grant, e.g. if the indication of priority level is greater than a threshold priority level or if a response time or latency component of the QoS is less than a threshold level (e.g. such as 1 second, 100 ms or 10 ms). For example, the message sent at stage 2 may be an indication that the UE positioning is for an emergency situation or other high priority scenario or is for an application (e.g. for IIoT or an autonomous UE) with a QoS containing a very low latency requirement or component. In other implementations, the message may simply request or recommend that upfront UL grants be provided to the UE 102 without providing an indication of priority level or QoS. The message may include an indication of a need for multiple grants for repetitions, e.g., for a periodic location request. In some implementations, the gNB 110-1 may determine whether repetitions are necessary and, if so, how many repetitions may be necessary, e.g., based on the signal quality with the UE 102, which the gNB 110-1 may obtain through a measurement report received from UE 102 or the mobility state of UE 102 that the gNB 110-1 obtains during an RRC connection setup, RRC connection resume or RRC connection re-establishment to UE 102.

At stage 3, the serving gNB 110-1 may send one or more UL grants to the UE 102 in response to the message at stage 2. The UL grants may be provided in a Downlink Control Information (DCI) message, e.g., (DCI Format 0_0/0_1), in the Physical layer or MAC layer. The UL grant may be sent to the UE 102 without a request from the UE 102 and before the UE 102 is prepared to send a response to the Request message from stage 1, in order to minimize delay in the UE 102'a response.

At stage 3A, the UE 102 may obtain any location measurements requested in the message received at stage 1 (e.g. if the message was an LPP Request Location Information). Stage 3A is optional and may not be performed, e.g. if the message at stage 1 requests UE capabilities and not location measurements. The location measurements may include measurements of RxTx, AOA, TOA, RSRP, RSTD, GNSS pseudorange, GNSS carrier phase etc. The UE 102 may also determine a location estimate for UE 102 using the location measurements and possibly using assistance data provided by the location server 152/162 at an earlier time (e.g. in the message received at stage 1 or in a message received by UE 102 prior to stage 1 and not shown in FIG. 2).

At stage 4, the UE 102 may send an LPP Response message to the location server 152/162 using the UL grant received in stage 3. The LPP Response message may be sent to the location server 152/162 via the gNB 110-1 and via either the AMF 154 (e.g. if the location server 152/162 is the LMF 152) or the UPF 158 (e.g. if the location server 152/162 is the SLP 162). If the positioning process is performed in user plane, the response may be sent via SUPL. The Response message, for example, may provide the positioning capabilities of the UE 102, e.g., when the Request message in stage 1 is a request for positioning capabilities. In another example, if the Request message in stage 1 is for measurements, the Response message may include location information, such as the location measurements and/or location estimate obtained at stage 3A.

At stage 5, the serving gNB 110-1 may provide another UL grant to the UE 102, e.g., in response to receiving and forwarding the LPP Response message at stage 4 to the location server 152/162, if message 2 from the location server 152/162 indicated that multiple grants or repetitions are needed, and/or if the gNB 110-1 determined that repetitions are necessary, e.g., due to the signal quality with the UE 102. The UL grant provided in stage 5 may be provided in a DCI message similar to stage 3.

At stage 6, the UE 102 may provide an additional LPP Response message to the location server 152/162 using the UL grant received in stage 5. The Response message, for example, may be a repetition of the previous Response from stage 4 or may be a periodic Response, e.g., to provide further periodic location measurement (e.g. obtained by UE 102 after stage 4 and not shown in FIG. 2) if requested at stage 1.

At stage 7, during the positioning session, the location server 152/162 may send a message to a different gNB 110-2 indicating that the UE 102 should be provided with UL grants from gNB 110-2 in order to respond to the request from stage 1. For example, where periodic location reports were requested at stage 1 and where the UE 102 has moved between cells and has either been handed over from gNB 110-1 to gNB 110-2 during a positioning session or has performed a cell reselection to gNB 110-2 (e.g. while in an idle or inactive state), the location server 152/162 may provide an indication to the new gNB 110-2 that the UE 102 should be provided with UL grants in order to respond to a request, e.g., similar to the indication provided to the initial gNB 110-1 in stage 2. The location server 152/162 may become aware of the move of UE 102 to a new cell for gNB 110-2 if a previous LPP Response message (e.g. sent at stage 4 or stage 6) indicates the new cell and/or indicates the new gNB 110-2 (e.g. within the previous LPP Response message or via an indication provided by AMF 154 or UPF 158 to location server 152/162 when forwarding the previous LPP Response message to location server 152/162).

In an alternative implementation, and where the UE 102 has moved between cells and has been handed over from gNB 110-1 to gNB 110-2 during a positioning session, stage 7 may not occur. Instead, at stage 7A and during the handover from gNB 110-1 to gNB 110-2, gNB 110-1 may provide an indication (e.g. an RRC indication) to the new gNB 110-2 that the UE 102 should be provided with UL grants in order to respond to the request at stage 1. For example, the indication sent at stage 7A may include some or all of the information received by gNB 110-1 at stage 2.

At stage 8, the new gNB 110-2 may send one or more UL grants to the UE 102 in response to the message from stage 7 or stage 7A. The UL grant provided in stage 8 may be provided in a DCI message similar to stage 3.

At stage 9, the UE 102 may send an LPP Response message to the location server 152/162 via the new gNB 110-2 using the UL grant received in stage 8. The LPP Response message, for example, may a periodic Response, e.g., to provide further periodic location measurements (e.g. obtained after stage 6 and not shown in FIG. 2) if requested at stage 1.

In some implementations, the UE 102, rather than the location server 152/162, may send a request for one or more UL grants before the UE 102 is prepared to send a response to a positioning request from the location server. In conventional positioning processes, for example, a UE will complete all positioning measurements before requesting an UL grant from a base station, resulting in delays in reporting the positioning measurements. In the present implementation, the UE 102 may request and receive the UL grant from the base station prior to completing the positioning measurements, so that the UE may send the positioning measurements (or location estimate) to the location server once completed, without waiting for the UL grant. In some implementations, the UE 102 may enter a connected state and request the UL grants before the UE 102 is ready to send the positioning measurements.

Figure 3:
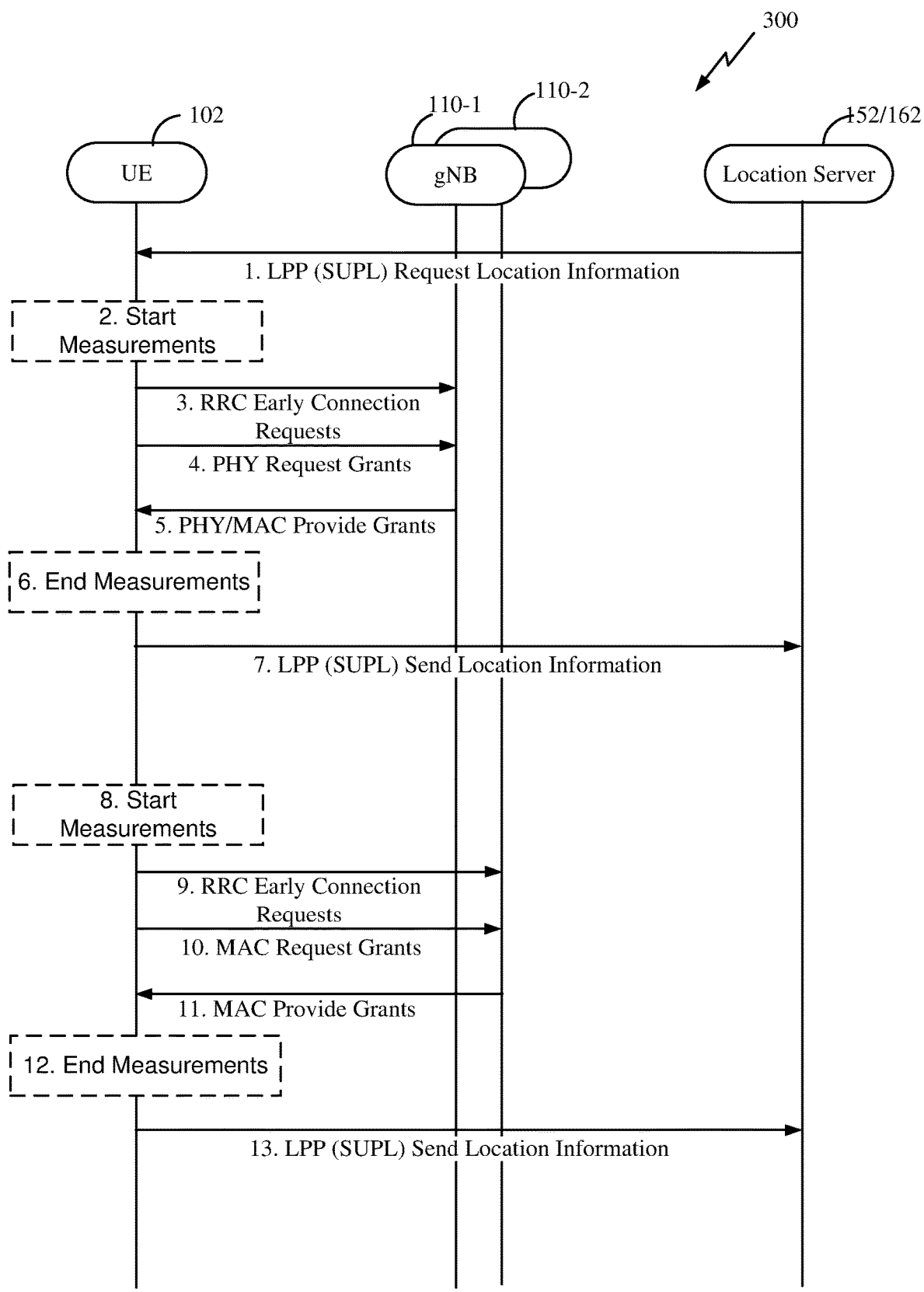
FIG. 3 shows a signaling flow that illustrates various messages sent between components of the communication system during a location session in which an early uplink grant is requested by a user equipment (UE).

FIG. 3 shows a signaling flow 300 that illustrates various messages sent between components of the communication system 100 depicted in FIG. 1, during a location session between the UE 102 and the location server 152/162 in which the UE 102 instigates the UL grant process before the UE 102 is prepared to provide positioning measurements. While the flow diagram is discussed, for ease of illustration, in relation to a 5G NR wireless access using gNBs 110, signaling flows similar to FIG. 3 involving ng-eNBs 114 or eNBs rather than gNBs 110 will be readily apparent to those with ordinary skill in the art. Furthermore, it should be understood that the messages in signaling flow 300 are provided to illustrate a process of obtaining upfront UL grants for the UE during a positioning session, and that additional messages and actions may be included in a positioning session. In the signaling flow 300, it is assumed that the UE 102 and location server 152/162 communicate using the LPP positioning protocol referred to earlier. The signaling flow 300 may be performed in control plane or user plane.

FIG. 3 illustrates a procedure in which the UE requests an UL grant prior to needing the UL grant for sending location information message to the serving gNB 110-1.

At stage 1, the location server 152/162 sends an LPP Request Location Information message to the UE 102 to request that the UE 102 provide, e.g., positioning measurements and/or a position estimate to the location server 152/162. If the positioning process is performed in user plane, the request may be sent via SUPL. The location server 152/162, for example, may request positioning measurements, such as RSTD, TOA, RxTx, AoA, AoD, etc. The location server 152/162 may also indicate whether UE based positioning or UE assisted positioning is requested. In some implementations, the location server 152/162 may also include in the LPP Request Location Information message a request for location measurements for other position methods which do not use PRS from cellular base stations (e.g. WiFi positioning or A-GNSS positioning). The request for location information may be a request for triggered or periodic location.

At stage 2, the UE 102 may begin performing positioning measurements, e.g., as requested by the Request Location Information message from stage 1. The positioning measurements may be based on PRS signals from cellular base stations or other positioning methods, e.g., using WiFi access points or using an SPS system.

At stage 3, if the UE 102 is in an idle state, the UE 102 may send an early connection request to the serving gNB 110-1 in order to enter a connected state with the gNB 110-1. The request for early connection, for example, may be sent using an RRC protocol. The request for early connection may be sent by the UE 102 prior to completing positioning measurements and is, thus, sent prior to needing the connection for reporting the location information.

At stage 4, the UE 102 sends a request for UL grants to the serving gNB 110-1. The request for UL grants may be sent in a scheduling request in a Physical layer message, on a Physical Uplink Control Channel (PUCCH). The request for UL grants is sent by the UE 102 prior to completing positioning measurements and is, thus, sent prior to needing the UL grants for reporting the location information. In some implementations, the UE 102 may indicate that multiple grants for repetitions, e.g., for a periodic location request. In some implementations, after receiving the request for UL grants, the gNB 110-1 may determine whether repetitions from UE 102 may be necessary (for any message sent by UE 102 using the UL grants) and, if so, how many repetitions may be necessary, e.g., based on the signal quality with the UE 102, which the gNB 110-1 may obtain through a measurement report sent by UE 102 or the mobility state of UE 102 that the gNB 110-1 obtains during a connection setup (e.g. at stage 3), a connection resume or a connection re-establishment for UE 102.

At stage 5, the serving gNB 110-1 may send one or more UL grants to the UE 102 in response to the request at stage 4 and/or possibly in response to determining whether repetitions from UE 102 may be necessary. The UL grants may be provided in a Downlink Control Information (DCI) message, e.g., (DCI Format 0_0/0_1), in the Physical layer or MAC layer. The UL grants may be sent to the UE 102 before the UE 102 is prepared to send a response to the Request message.

At stage 6, the UE 102 may finish performing the positioning measurements started at stage 2. It should be understood that the timing and duration of the positioning measurements illustrated in stages 2 and 6 is illustrative and that the UE 102 may start measurements at any time and the duration of the measurements may be longer or shorter than indicated in FIG. 3. Nevertheless, as indicated by the relation of stage 4 and stage 6, the request for UL grants sent by the UE 102 at stage 4 is sent prior to the UE 102 completing the positioning measurements or needing the UL grant to send the location information to the location server 152/162.

At stage 7, the UE 102 may send an LPP Response message with the requested location information to the location server 152/162 using the UL grant(s) received in stage 5. If the positioning process is performed in user plane, the response may be sent via SUPL. The LPP Response message may be sent to the location server 152/162 via the gNB 110-1 and via either the AMF 154 (e.g. if the location server 152/162 is the LMF 152) or the UPF 158 (e.g. if the location server 152/162 is the SLP 162). The location information, for example, may include positioning measurements, such as RSTD, RxTx, AOA, TOA, RSRP, etc., or other types of measurements, such as using WiFi or SPS measurements, that is obtained by the UE 102, e.g., between stages 2 and 6, e.g., for a UE-assisted positioning process, or a position estimate from the UE 102 determined using positioning measurements and assistance data provided by the location server 152/162, e.g., for a UE based positioning process.

At stage 8, the UE 102 may start another set of positioning measurements, e.g., in response to a trigger or periodic event and if triggered or periodic location was requested at stage 1. Similar to stage 2, the positioning measurements may be based on PRS signals from cellular base stations or other positioning methods, e.g., using WiFi access points or using an SPS system.

At stage 9, if the UE 102 is in an idle state, the UE 102 may send an early connection request and enter a connected state with a serving gNB 110. As illustrated in FIG. 3, if the UE 102 has moved between cells and has been handed over or performed a cell reselection from gNB 110-1 to gNB 110-2 during a positioning session, the UE 102 may send the request for early connection to the new gNB 110-2. The request for early connection may be sent by the UE 102 prior to completing positioning measurements and is, thus, sent prior to needing the connection for reporting the location information. It is noted that if handover or cell reselection did not occur, the role and actions of gNB 110-2 in FIG. 3 at stages 9, 10, 11 and 13 would be performed by gNB 110-1.

At stage 10, the UE 102 sends a request for UL grants to the new gNB 110-2, e.g., if the UE 102 has been handed over or performed a cell reselection from gNB 110-1 to gNB 110-2. Similar to stage 4, the request for UL grants may be sent in a scheduling request in a Physical layer message, on a Physical Uplink Control Channel (PUCCH). The request for UL grants is sent by the UE 102 prior to completing positioning measurements and is, thus, sent prior to needing the UL grants for reporting the location information. In some implementations, the UE 102 may indicate that multiple grants are needed for repetitions, e.g., for a periodic location request. In some implementations, the gNB 110-2 may determine whether and how many repetitions may be necessary, e.g., based on a signal quality with the UE 102, which the gNB 110-2 may obtain through a measurement report from UE 102 or a mobility state of UE 102 that the gNB 110-2 obtains during a connection setup, a connection resume or a connection re-establishment for UE 102.

At stage 11, the new gNB 110-2 may send one or more UL grants to the UE 102 in response to the request at stage 10. Similar to stage 5, the UL grants may be provided in a DCI message, e.g., (DCI Format 0_0/0_1), in the Physical layer or MAC layer. The UL grants may be sent to the UE 102 before the UE 102 is prepared to send a response to the Request message.

At stage 12, the UE 102 may finish the performing positioning measurements started at stage 8. It should be understood that the timing and duration of the positioning measurements illustrated in stages 8 and 12 is illustrative and that the UE 102 may start measurements at any time and the duration of the measurements may be longer or shorter than indicated in FIG. 3. Nevertheless, as indicated by the relation of stage 10 and stage 12, the request for UL grants sent by the UE 102 at stage 10 is sent prior to the UE 102 completing the positioning measurements or needing the UL grant to send the location information to the location server 152/162.

At stage 13, the UE 102 may send an LPP Response message with the requested location information to the location server 152/162 using the UL grant(s) received in stage 11. The LPP Response message may be sent to the location server 152/162 via the gNB 110-2 and via either the AMF 154 (e.g. if the location server 152/162 is the LMF 152) or the UPF 158 (e.g. if the location server 152/162 is the SLP 162). If the positioning process is performed in user plane, the response may be sent via SUPL. The location information, for example, may include positioning measurements, such as RSTD, RxTx, AOA, TOA, RSRP, etc., or other types of measurements, such as using WiFi or SPS measurements, that is obtained by the UE 102, e.g., between stages 8 and 12, e.g., for a UE-assisted positioning process, or a position estimate from the UE 102 determined using positioning measurements and assistance data provided by the location server 152/162, e.g., for a UE based positioning process.

Figure 4:
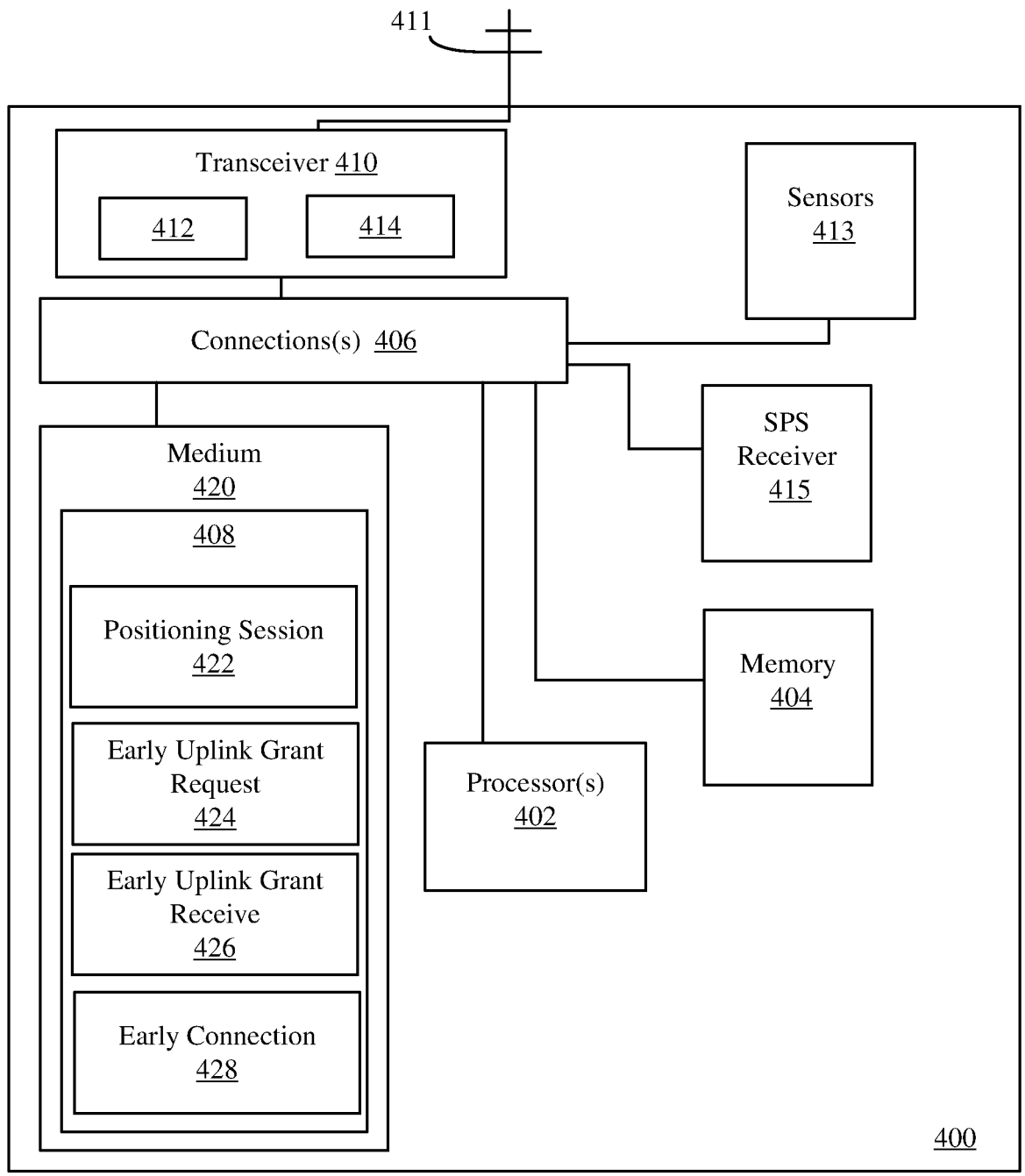
FIG. 4 shows a schematic block diagram illustrating certain exemplary features of a UE that is configured for early uplink grants for responding to location service requests.

FIG. 4 shows a schematic block diagram illustrating certain exemplary features of a UE 400, e.g., which may be the UE 102 shown in FIG. 1, that is configured for early uplink grants for responding to location service requests, as discussed herein. The UE 400 may perform the message flows shown in FIGS. 2 and 3, the process flow shown in FIG. 7 and accompanying algorithms discussed herein. The UE 400 may, for example, include one or more processors 402, memory 404, an external interface such as at least one wireless transceiver 410 (e.g., wireless network interface), SPS receiver 415, and one or more sensors 413, which may be operatively coupled with one or more connections 406 (e.g., buses, lines, fibers, links, etc.) to non-transitory computer readable medium 420 and memory 404. The SPS receiver 415, for example, may receive and process SPS signals from SVs 190 shown in FIG. 1. The one or more sensors 413, for example, may be an inertial measurement unit (IMU) that may include one or more accelerometers, one or more gyroscopes, a magnetometer, etc. The UE 400 may further include additional items, which are not shown, such as a user interface that may include e.g., a display, a keypad or other input device, such as virtual keypad on the display, through which a user may interface with the UE. In certain example implementations, all or part of UE 400 may take the form of a chipset, and/or the like.

The at least one wireless transceiver 410 may be a transceiver for both a WWAN communication system and a WLAN communication system, or may include separate transceivers for WWAN and WLAN. The wireless transceiver 410 may include a transmitter 412 and receiver 414 coupled to one or more antennas 411 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. Thus, the transmitter 412 may include multiple transmitters that may be discrete components or combined/integrated components, and/or the receiver 414 may include multiple receivers that may be discrete components or combined/integrated components. The wireless transceiver 410 may be configured to communicate signals (e.g., with base stations and access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The transceiver 410 may be communicatively coupled to a transceiver interface, e.g., by optical and/or electrical connection, which may be at least partially integrated with the transceiver 410.

In some embodiments, UE 400 may include antenna 411, which may be internal or external. UE antenna 411 may be used to transmit and/or receive signals processed by wireless transceiver 410. In some embodiments, UE antenna 411 may be coupled to wireless transceiver 410. In some embodiments, measurements of signals received (transmitted) by UE 400 may be performed at the point of connection of the UE antenna 411 and wireless transceiver 410. For example, the measurement point of reference for received (transmitted) RF signal measurements may be an input (output) terminal of the receiver 414 (transmitter 412) and an output (input) terminal of the UE antenna 411. In a UE 400 with multiple UE antennas 411 or antenna arrays, the antenna connector may be viewed as a virtual point representing the aggregate output (input) of multiple UE antennas. In some embodiments, UE 400 may measure received signals including signal strength and TOA measurements and the raw measurements may be processed by the one or more processors 402.

The one or more processors 402 may be implemented using a combination of hardware, firmware, and software. For example, the one or more processors 402 may be configured to perform the functions discussed herein by implementing one or more instructions or program code 408 on a non-transitory computer readable medium, such as medium 420 and/or memory 404. In some embodiments, the one or more processors 402 may represent one or more circuits configurable to perform at least a portion of a data signal computing procedure or process related to the operation of UE 400.

The medium 420 and/or memory 404 may store instructions or program code 408 that contain executable code or software instructions that when executed by the one or more processors 402 cause the one or more processors 402 to operate as a special purpose computer programmed to perform the techniques disclosed herein. As illustrated in UE 400, the medium 420 and/or memory 404 may include one or more components or modules that may be implemented by the one or more processors 402 to perform the methodologies described herein. While the components or modules are illustrated as software in medium 420 that is executable by the one or more processors 402, it should be understood that the components or modules may be stored in memory 404 or may be dedicated hardware either in the one or more processors 402 or off the processors.

A number of software modules and data tables may reside in the medium 420 and/or memory 404 and be utilized by the one or more processors 402 in order to manage both communications and the functionality described herein. It should be appreciated that the organization of the contents of the medium 420 and/or memory 404 as shown in UE 400 is merely exemplary, and as such the functionality of the modules and/or data structures may be combined, separated, and/or be structured in different ways depending upon the implementation of the UE 400.

The medium 420 and/or memory 404 may include a positioning session module 422 that when implemented by the one or more processors 402 configures the one or more processors 402 to engage in a positioning session with a location server through a serving base station, via the wireless transceiver 410, including receiving location service requests, such as a request for positioning capabilities, and a request of location information, such as positioning measurements, e.g., for a UE-assisted positioning process, or a position estimate, e.g., for a UE based positioning process. The one or more processors 402 are configured to send a response to the location service requests, e.g. by providing positioning capabilities and the requested location information using an uplink grant received prior to needing the UL grants for reporting location information. The one or more processors 402 may be further configured to receive assistance data. The one or more processors 402 are further configured to perform requested positioning measurements, which may be, e.g., RxTx, AOA, TOA, RSRP, etc., or other types of measurements, such as using WiFi or SPS measurements. The one or more processors 402 may be configured to receive a periodic location request. The one or more processors 402 maybe further configured to determine a position estimate based on the positioning measurements and the assistance data.

The medium 420 and/or memory 404 may include an early uplink grant request module 424 that when implemented by the one or more processors 402 configures the one or more processors 402 to send a request for UL grants to a serving gNB. The one or more processors 402 may be configured to send the request for UL grant prior to completing positioning measurements, thus, prior to needing the UL grants for reporting location information. The one or more processors 402 may be configured to send a request for a single UL grant or multiple grants for repetitions, e.g., for a periodic location request. The one or more processors 402 may be configured to send a request to a new serving base station after a handover, during a periodic location session.

The medium 420 and/or memory 404 may include an early uplink grant receive module 426 that when implemented by the one or more processors 402 configures the one or more processors 402 to receive a UL grant from the serving gNB. The one or more processors 402 may be configured to receive a single UL grant or multiple grants for repetitions, e.g., for a periodic location request.

The medium 420 and/or memory 404 may include an early connection module 428 that when implemented by the one or more processors 402 configures the one or more processors 402 to send a request for early connection before the UE is ready to send the location information to the location server, if the UE is in idle mode during a positioning session.

The methodologies described herein may be implemented by various means depending upon the application. For example, these methodologies may be implemented in hardware, firmware, software, or any combination thereof. For a hardware implementation, the one or more processors 402 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 420 or memory 404 that is connected to and executed by the one or more processors 402. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 408 on a non-transitory computer readable medium, such as medium 420 and/or memory 404. Examples include computer readable media encoded with a data structure and computer readable media encoded with a computer program code 408. For example, the non-transitory computer readable medium including program code 408 stored thereon may include program code 408 to support early uplink grants for responding to location service requests in a manner consistent with disclosed embodiments. Non-transitory computer readable medium 420 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 408 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 420, instructions and/or data may be provided as signals on transmission media included in a communication apparatus. For example, a communication apparatus may include a wireless transceiver 410 having signals indicative of instructions and data. The instructions and data are configured to cause one or more processors to implement the functions outlined in the claims That is, the communication apparatus includes transmission media with signals indicative of information to perform disclosed functions.

Memory 404 may represent any data storage mechanism. Memory 404 may include, for example, a primary memory and/or a secondary memory. Primary memory may include, for example, a random access memory, read only memory, etc. While illustrated in this example as being separate from one or more processors 402, it should be understood that all or part of a primary memory may be provided within or otherwise co-located/coupled with the one or more processors 402. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 420. As such, in certain example implementations, the methods and/or apparatuses presented herein may take the form in whole or part of a computer readable medium 420 that may include computer implementable program code 408 stored thereon, which if executed by one or more processors 402 may be operatively enabled to perform all or portions of the example operations as described herein. Computer readable medium 420 may be a part of memory 404.

Figure 5:
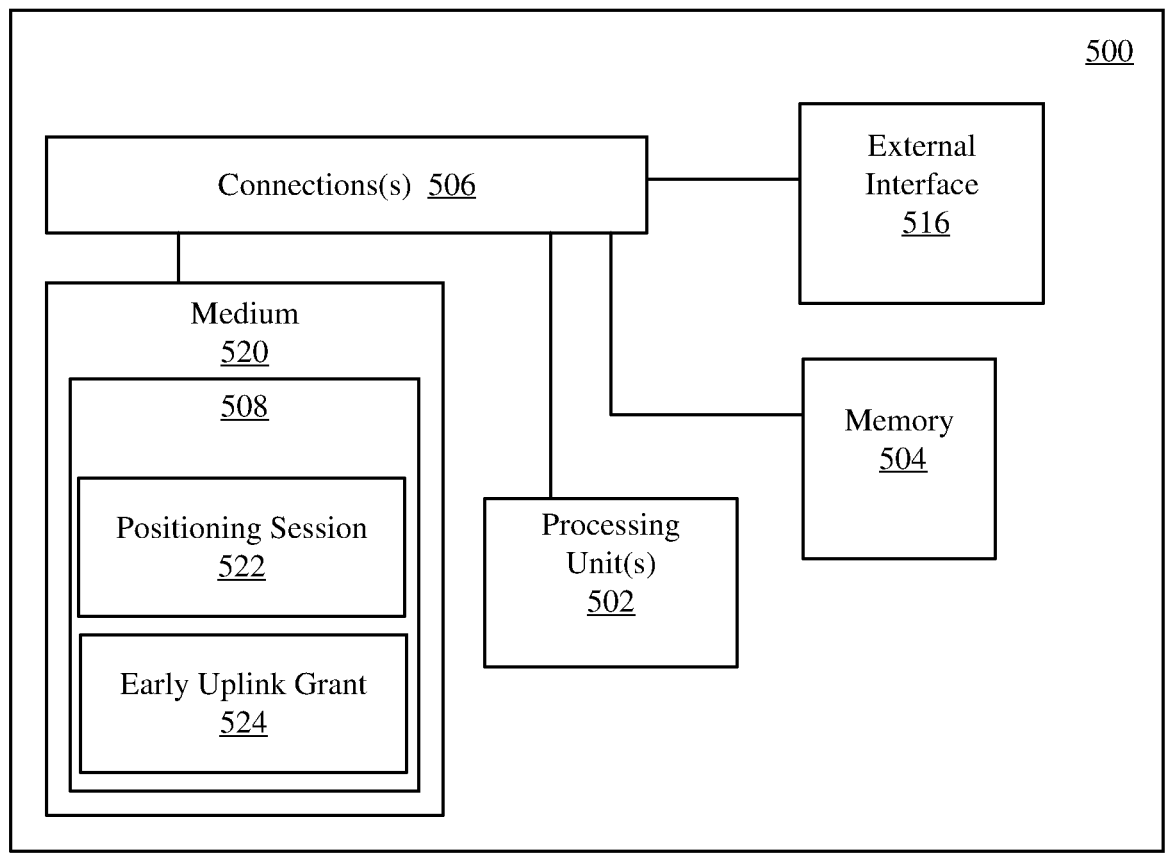
FIG. 5 shows a schematic block diagram illustrating certain exemplary features of a location server that is configured to support early uplink grants for a UE to respond to location service requests.

FIG. 5 shows a schematic block diagram illustrating certain exemplary features of a location server 500, e.g., LMF 152 or SLP 162, shown in FIGS. 1 and 2, that is configured to support early uplink grants for a UE to respond to location service requests, as discussed herein. The location server 500 may perform the message flows shown in FIGS. 2 and 3, the process flow shown in FIG. 8 and algorithms discussed herein. Location server 500 may, for example, include one or more processors 502, memory 504, an external interface 516 (e.g., wireline or wireless network interface to base stations and/or entities in the core network), which may be operatively coupled with one or more connections 506 (e.g., buses, lines, fibers, links, etc.) to non-transitory computer readable medium 520 and memory 504. In certain example implementations, all or part of location server 500 may take the form of a chipset, and/or the like.

The one or more processors 502 may be implemented using a combination of hardware, firmware, and software. For example, the one or more processors 502 may be configured to perform the functions discussed herein by implementing one or more instructions or program code 508 on a non-transitory computer readable medium, such as medium 520 and/or memory 504. In some embodiments, the one or more processors 502 may represent one or more circuits configurable to perform at least a portion of a data signal computing procedure or process related to the operation of location server 500.

The medium 520 and/or memory 504 may store instructions or program code 508 that contain executable code or software instructions that when executed by the one or more processors 502 cause the one or more processors 502 to operate as a special purpose computer programmed to perform the techniques disclosed herein. As illustrated in location server 500, the medium 520 and/or memory 504 may include one or more components or modules that may be implemented by the one or more processors 502 to perform the methodologies described herein. While the components or modules are illustrated as software in medium 520 that is executable by the one or more processors 502, it should be understood that the components or modules may be stored in memory 504 or may be dedicated hardware either in the one or more processors 502 or off the processors.

A number of software modules and data tables may reside in the medium 520 and/or memory 504 and be utilized by the one or more processors 502 in order to manage both communications and the functionality described herein. It should be appreciated that the organization of the contents of the medium 520 and/or memory 504 as shown in location server 500 is merely exemplary, and as such the functionality of the modules and/or data structures may be combined, separated, and/or be structured in different ways depending upon the implementation of the location server 500.

The medium 520 and/or memory 504 may include a positioning session module 522 that when implemented by the one or more processors 502 configures the one or more processors 502 to engage in a positioning session with a UE through a serving base station via the external interface 516, including sending location service requests, such as a request for positioning capabilities, and a request of location information, such as positioning measurements, e.g., for a UE-assisted positioning process, or a position estimate, e.g., for a UE based positioning process. The one or more processors 502 are configured to receive responses to the location service requests, e.g. including receiving positioning capabilities and the requested location information from a UE. The one or more processors 402 may be configured to send and receive messages for a periodic location session. The one or more processors 502 maybe further configured to send assistance data. The one or more processors 502 may be further configured to determine a position estimate for the UE based on received positioning measurements, which as RxTx, AOA, TOA, RSRP, etc., or other types of measurements, such as using WiFi or SPS measurements.

The medium 520 and/or memory 504 may include an early uplink grant module 524 that when implemented by the one or more processors 502 configures the one or more processors 502 to send, via the external interface 516, a message to the serving base station for the UE to instigate an uplink grant for the UE to respond to a location services request. The one or more processors 502 is configured to send the message to instigate the grant before the UE needs the UL grants, i.e., before the UE is ready to send the response to the request. For example, the message may be sent at approximately the same time as a request sent to the UE. The message may provide a priority level of the positioning session to the base station or may request or recommend an early UL grant for the UE without an indication of priority level. The message may indicate whether multiple grants for repetitions, e.g., for a periodic location request, are needed. The one or more processors 502 may be configured to send a send a second message to a different serving base station when the UE has been handed off to the during serving base station, e.g., during a periodic location session.

The methodologies described herein may be implemented by various means depending upon the application. For example, these methodologies may be implemented in hardware, firmware, software, or any combination thereof. For a hardware implementation, the one or more processors 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 520 or memory 504 that is connected to and executed by the one or more processors 502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 508 on a non-transitory computer readable medium, such as medium 520 and/or memory 504. Examples include computer readable media encoded with a data structure and computer readable media encoded with a computer program 508. For example, the non-transitory computer readable medium including program code 508 stored thereon may include program code 508 to support early uplink grants for a UE to respond to location service requests in a manner consistent with disclosed embodiments. Non-transitory computer readable medium 520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 520, instructions and/or data may be provided as signals on transmission media included in a communication apparatus. For example, a communication apparatus may include an external interface 516 having signals 1224 indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random access memory, read only memory, etc. While illustrated in this example as being separate from one or more processors 502, it should be understood that all or part of a primary memory may be provided within or otherwise co-located/coupled with the one or more processors 502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 520. As such, in certain example implementations, the methods and/or apparatuses presented herein may take the form in whole or part of a computer readable medium 520 that may include computer implementable code 508 stored thereon, which if executed by one or more processors 502 may be operatively enabled to perform all or portions of the example operations as described herein. Computer readable medium 520 may be a part of memory 504.

Figure 6:
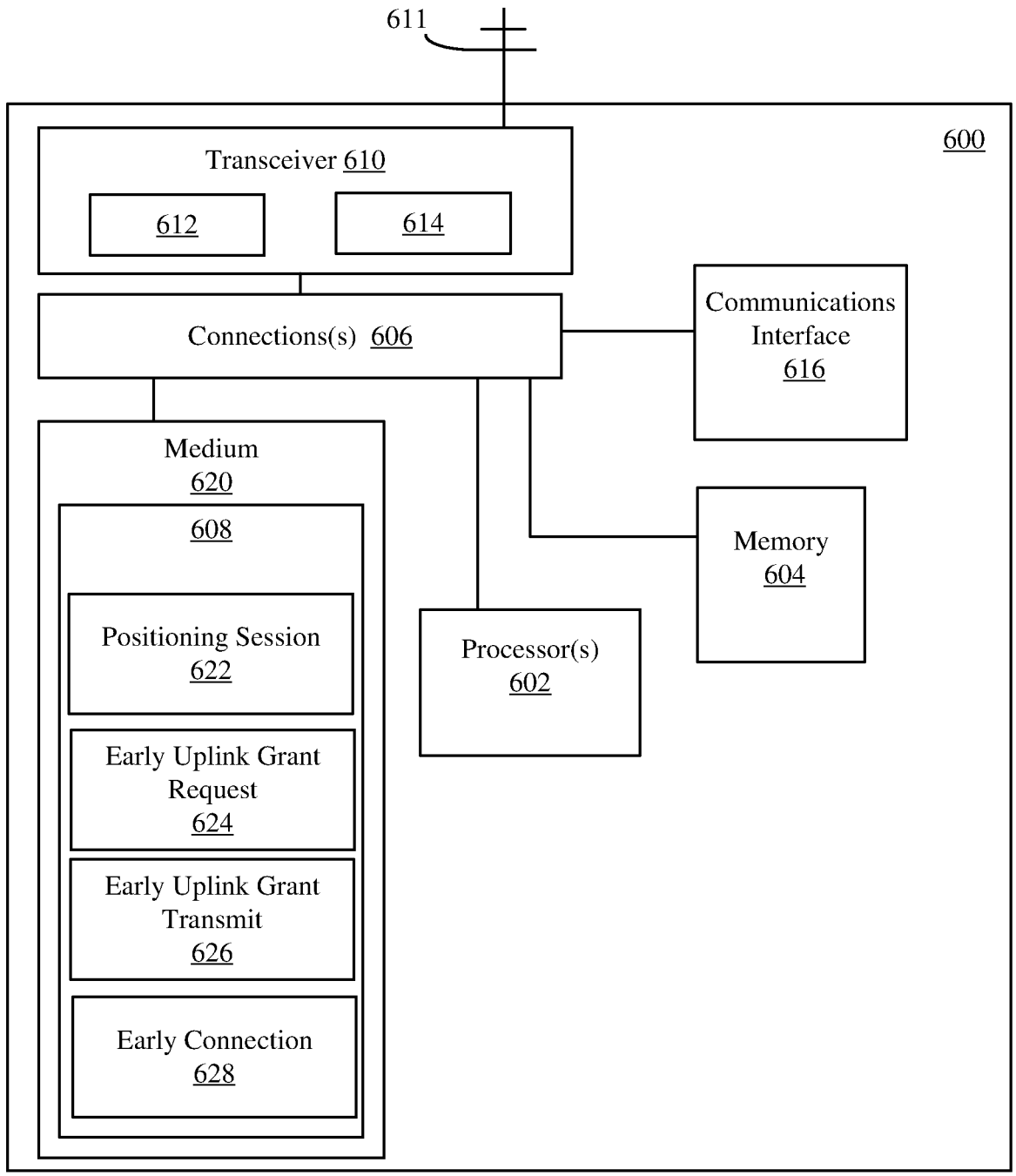
FIG. 6 shows a schematic block diagram illustrating certain exemplary features of a base station that is configured to support early uplink grants for a UE to respond to location service requests.

FIG. 6 shows a schematic block diagram illustrating certain exemplary features of a base station 600, e.g., gNB 110 in FIG. 1, enabled to support early uplink grants for a UE to respond to location service requests, as described herein. The base station 600 may be an eNB, gNB (e.g. gNB 110) or ng-eNB (e.g. ng-eNB 114). The base station 600 may perform the message flows shown in FIGS. 2 and 3, the process flow shown in FIG. 9 and accompanying algorithms discussed herein. Base station 600 may, for example, include one or more processors 602, memory 604, an external interface, which may include a transceiver 610 (e.g., wireless network interface) and a communications interface 616 (e.g., wireline or wireless network interface to other base stations and/or entities in the core network such as a location server directly or via one or more intervening entities), which may be operatively coupled with one or more connections 606 (e.g., buses, lines, fibers, links, etc.) to non-transitory computer readable medium 620 and memory 604. The base station 600 may further include additional items, which are not shown, such as a user interface that may include e.g., a display, a keypad or other input device, such as virtual keypad on the display, through which a user may interface with the base station. In certain example implementations, all or part of base station 600 may take the form of a chipset, and/or the like. Transceiver 610 may, for example, include a transmitter 612 enabled to transmit one or more signals over one or more types of wireless communication networks and a receiver 614 to receive one or more signals transmitted over the one or more types of wireless communication networks. The communications interface 616 may be a wired or wireless interface capable of connecting to other base stations in the RAN or network entities, such as a location server, e.g., LMF 152 or SLP 162 through various entities such as AMF 154 or UPF 158, shown in FIG. 1.

In some embodiments, base station 600 may include antenna 611, which may be internal or external. Antenna 611 may be used to transmit and/or receive signals processed by transceiver 610. In some embodiments, antenna 611 may be coupled to transceiver 610. In some embodiments, measurements of signals received (transmitted) by base station 600 may be performed at the point of connection of the antenna 611 and transceiver 610. For example, the measurement point of reference for received (transmitted) RF signal measurements may be an input (output) terminal of the receiver 614 (transmitter 612) and an output (input) terminal of the antenna 611. In a base station 600 with multiple antennas 611 or antenna arrays, the antenna connector may be viewed as a virtual point representing the aggregate output (input) of multiple antennas. In some embodiments, base station 600 may measure received signals including signal strength and TOA measurements and the raw measurements may be processed by the one or more processors 602.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of base station 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in base station 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors. A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in base station 600 is merely exemplary, and as such the functionality of the modules and/or data structures may be combined, separated, and/or be structured in different ways depending upon the implementation of the base station 600.

The medium 620 and/or memory 604 may include a positioning session module 622 that when implemented by the one or more processors 602 configures the one or more processors 602 to engage in a positioning session with a UE and a location server, via the external interface (transceiver 610 and communications interface 616). For example, the one or more processors 602 may be configured to receive location service request messages from the location server and forward the location service request messages to the UE, e.g., in LPP messages or SUPL messages. The one or more processors 602 is further configured to receive location service response messages from the UE and forward the location service response messages to the location server, e.g., in LPP messages or SUPL messages.

The medium 620 and/or memory 604 may include an early uplink grant request module 624 that when implemented by the one or more processors 602 configures the one or more processors 602 to receive a message instigating an early UL grant for the UE. The message may be received from either the location server or the UE. The message, for example, may indicate a priority level for a UE positioning session, such as whether the positioning session is for an emergency scenario. The one or more processors 602 may be configured to determine if the priority level warrants an early UL grant, e.g. if the indication of priority level is greater than a threshold priority level. The one or more processors 602 may be configured to receive a message that simply request or recommends upfront UL grants be provided to the UE, and to accept or reject the request, e.g., based on network load. The message may include an indication of a need for multiple grants for repetitions, e.g., for a periodic location request. The one or more processors 602 may be configured to determine whether repetitions are necessary and, if so, how many repetitions may be necessary, e.g., based on the signal quality with the UE, which may be obtained through a measurement report or the mobility state from the connection setup, connection resume or re-establishment with the UE.

The medium 620 and/or memory 604 may include an early uplink grant transmit module 626 that when implemented by the one or more processors 602 configures the one or more processors 602 to send an early UL grant to the UE, i.e., prior to the UE needing the UL grant for responding to a location services request. The one or more processors 602 may be configured to send a single UL grant or multiple grants for repetitions, e.g., for a periodic location request.

The medium 620 and/or memory 604 may include an early connection module 628 that when implemented by the one or more processors 602 configures the one or more processors 602 to receive a request for early connection before the UE is ready to send the location information to the location server, if the UE is in idle mode during a positioning session.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support early uplink grants for a UE to respond to location service requests in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a transceiver 610 having signals indicative of instructions and data. The instructions and data are configured to cause one or more processors to implement the functions outlined in the claims That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
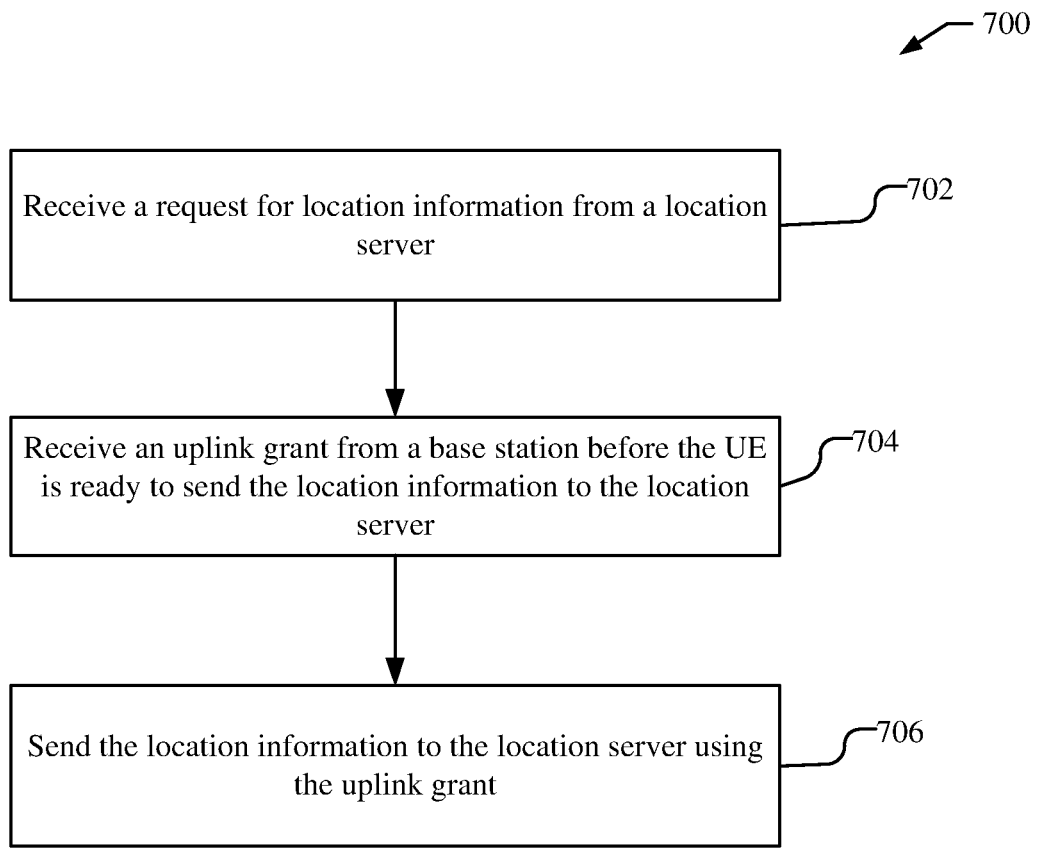
FIG. 7 shows a flowchart for an exemplary method for supporting location services for a UE using an early uplink grant that is performed by the UE.

FIG. 7 shows a flowchart for an exemplary method 700 for supporting location services for a user equipment (UE), such as the UE 102 shown in FIG. 1, performed by the UE, in a manner consistent with disclosed implementations.

At block 702, the UE receives a request for location information from a location server (e.g. an LMF 152 or SLP 162), e.g., as discussed at stage 1 of FIG. 2 or stage 1 of FIG. 3. A means for receiving a request for location information from a location server may include, e.g., the wireless transceiver 410 and one or more processors 402 with dedicated hardware or implementing executable code or software instructions in memory 404 and/or medium 420 in UE 400, such as the positioning session module 422, shown in FIG. 4.

At block 704, the UE receives an uplink grant from a base station (e.g. a serving gNB 110-1) before the UE is ready to send the location information to the location server, e.g., as discussed at stage 3 of FIG. 2 or stage 5 of FIG. 3. The uplink grant, for example, may be received in a Downlink Control Information (DCI) message. A means for receiving an uplink grant from a base station before the UE is ready to send the location information to the location server may include, e.g., the wireless transceiver 410 and one or more processors 402 with dedicated hardware or implementing executable code or software instructions in memory 404 and/or medium 420 in UE 400, such as the early uplink grant receive module 426, shown in FIG. 4.

At block 706, the UE sends the location information to the location server using the uplink grant, e.g., as discussed at stage 4 of FIG. 2 or stage 7 of FIG. 3. A means for sending the location information to the location server using the uplink grant may include, e.g., the wireless transceiver 410 and one or more processors 402 with dedicated hardware or implementing executable code or software instructions in memory 404 and/or medium 420 in UE 400, such as the positioning session module 422, shown in FIG. 4.

In one implementation, for example, the uplink grant from the base station may be received before the UE has completed positioning measurements, e.g., as discussed at stage 4 of FIG. 2 or stage 6 of FIG. 3. In one implementation, the location information may comprise the positioning measurements, e.g., as discussed at stage 4 of FIG. 2 or stage 7 of FIG. 3. In one implementation, the UE may determine a position estimate based on the positioning measurements, wherein the location information comprises the position estimate, e.g., as discussed at stage 4 of FIG. 2 or stage 7 of FIG. 3. A means for determining a position estimate based on the positioning measurements, wherein the location information comprises the position estimate may include, e.g., the one or more processors 402 with dedicated hardware or implementing executable code or software instructions in memory 404 and/or medium 420 in UE 400, such as the positioning session module 422, shown in FIG. 4.

In one implementation, the request for location information comprises a request for periodic location information and the UE may receive periodic uplink grants from the base station in each period before the UE is ready to send periodic location information to the location server, e.g., as discussed at stages 3, 5, and 8 of FIG. 2 or stages 5 and 11 of FIG. 3; and may send the periodic location information to the location server using the uplink grants, e.g., as discussed at stages 4, 6, and 9 of FIG. 2 or stages 7 and 13 of FIG. 3. A means for receiving periodic uplink grants from the base station in each period before the UE is ready to send periodic location information to the location server may include, e.g., the wireless transceiver 410 and one or more processors 402 with dedicated hardware or implementing executable code or software instructions in memory 404 and/or medium 420 in UE 400, such as the early uplink grant receive module 426, shown in FIG. 4. A means for sending the periodic location information to the location server using the uplink grants may include, e.g., the wireless transceiver 410 and one or more processors 402 with dedicated hardware or implementing executable code or software instructions in memory 404 and/or medium 420 in UE 400, such as the positioning session module 422, shown in FIG. 4.

In one implementation, the UE receives the uplink grant from the base station in response to a message sent from the location server to the base station to instigate the uplink grant for the UE, e.g., as discussed at stage 2 of FIG. 2. In some implementations, the request for location information may be a request for periodic location information, and the UE may receive an uplink grant from a second base station before the UE is ready to send periodic location information to the location server. The uplink grant from the second base station may be received in response to either a second request for the uplink grant sent to the second base station from the location server or an indication of UL grants sent from the base station to the second base station during a handover of the UE from the base station to the second base station, e.g., as discussed at stages 7 and 8 of FIG. 2. The uplink grant from the second base station may alternatively be received in response to an indication of UL grants sent from the base station to the second base station during a handover of the UE from the base station to the second base station, e.g., as discussed at stages 7A and 8 of FIG. 2. The UE may then send the periodic location information to the location server using the uplink grant, e.g., as discussed at stage 9 of FIG. 2. A means for receiving an uplink grant from a second base station before the UE is ready to send periodic location information to the location server in response to a second request for the uplink grant sent to the second base station from the location server may include, e.g., the wireless transceiver 410 and one or more processors 402 with dedicated hardware or implementing executable code or software instructions in memory 404 and/or medium 420 in UE 400, such as the early uplink grant receive module 426, shown in FIG. 4. A means for sending the periodic location information to the location server using the uplink grant may include, e.g., the wireless transceiver 410 and one or more processors 402 with dedicated hardware or implementing executable code or software instructions in memory 404 and/or medium 420 in UE 400, such as the positioning session module 422, shown in FIG. 4.

In one implementation, the UE may send a request for the uplink grant to the base station before the UE is ready to send the location information to the location server, wherein the UE receives the uplink grant from the base station in response to the request for the uplink grant, e.g., as discussed at stage 4 of FIG. 3. A means for sending a request for the uplink grant to the base station before the UE is ready to send the location information to the location server, wherein the UE receives the uplink grant from the base station in response to the request for the uplink grant may include, e.g., the wireless transceiver 410 and one or more processors 402 with dedicated hardware or implementing executable code or software instructions in memory 404 and/or medium 420 in UE 400, such as the early uplink grant request module 424, shown in FIG. 4. In one implementation, the UE may additionally send a request for early connection before the UE is ready to send the location information to the location server, e.g., as discussed at stage 3 of FIG. 3. A means for sending a request for early connection before the UE is ready to send the location information to the location server may include, e.g., the wireless transceiver 410 and one or more processors 402 with dedicated hardware or implementing executable code or software instructions in memory 404 and/or medium 420 in UE 400, such as the early connection module 428, shown in FIG. 4. In one example, the request for location information may be a request for periodic location information, and the UE may send a request for the uplink grant to the base station in each period before the UE is ready to send periodic location information to the location server, e.g., as discussed at stages 4 and 10 of FIG. 3, and send the periodic location information to the location server using the uplink grants, e.g., as discussed at stages 7 and 13 of FIG. 3. A means for sending a request for the uplink grant to the base station in each period before the UE is ready to send periodic location information to the location server may include, e.g., the wireless transceiver 410 and one or more processors 402 with dedicated hardware or implementing executable code or software instructions in memory 404 and/or medium 420 in UE 400, such as the early uplink grant request module 426, shown in FIG. 4. A means for sending the periodic location information to the location server using the uplink grants may include, e.g., the wireless transceiver 410 and one or more processors 402 with dedicated hardware or implementing executable code or software instructions in memory 404 and/or medium 420 in UE 400, such as the positioning session module 422, shown in FIG. 4.

In one implementation, the request for location information may be received via Long Term Evolution (LTE) Positioning Protocol (LPP) and the location information may be sent via LPP. In another implantation, the request for location information may be received via Secure User Plane Location (SUPL) and the location information may be sent via SUPL.

Figure 8:
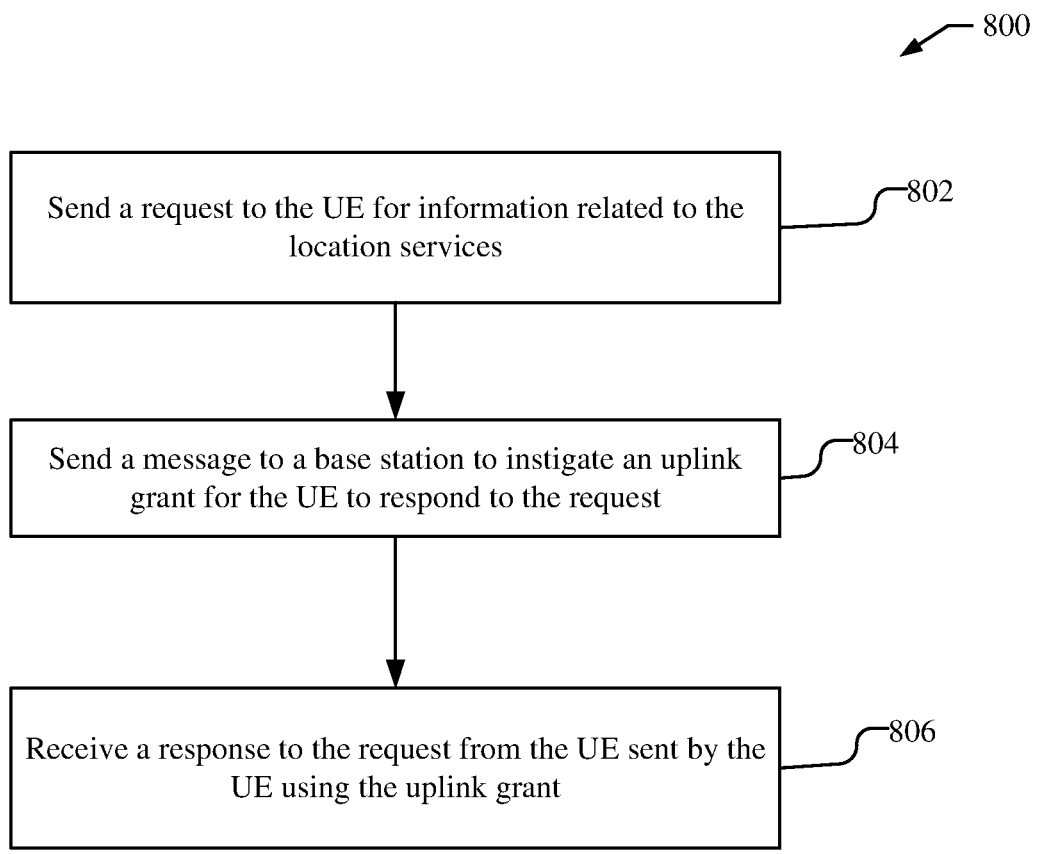
FIG. 8 shows a flowchart for an exemplary method for supporting location services for a UE using an early uplink grant that is performed by the location server.

FIG. 8 shows a flowchart for an exemplary method 800 for supporting location services for a user equipment (UE), such as the UE 102 shown in FIG. 1, performed by a location server, such as LMF 152 or SLP 162 shown in FIG. 1, in a manner consistent with disclosed implementations.

At block 802, the location server sends a request to the UE for information related to the location services, e.g., as discussed at stage 1 of FIG. 2. A means for sending a request to the UE for information related to the location services may include, e.g., the external interface 516 and one or more processors 502 with dedicated hardware or implementing executable code or software instructions in memory 504 and/or medium 520 in location server 500, such as the positioning session module 522, shown in FIG. 5.

At block 804, the location server sends a message to a base station to instigate an uplink grant for the UE to respond to the request, e.g., as discussed at stage 2 of FIG. 2. The uplink grant from the base station, for example, is received by the UE before the UE is ready to send the response to the request. For example, the message to instigate the uplink grant may be sent in a New Radio Positioning Protocol A (NRPPa) message. A means for sending a message to a base station to instigate an uplink grant for the UE to respond to the request may include, e.g., the external interface 516 and one or more processors 502 with dedicated hardware or implementing executable code or software instructions in memory 504 and/or medium 520 in location server 500, such as the early uplink grant module 524, shown in FIG. 5.

At block 806, the location server receives a response to the request from the UE sent by the UE using the uplink grant, e.g., as discussed at stage 4 of FIG. 2. For example, in one implementation, the request related to the location services may be a request for capabilities of the UE and the response to the request may be a capabilities response. In one implementation, the request for information related to the location services may be a request for location information and the response to the request may be the location information. The location information, for example, may include positioning measurements by the UE. The location information, for example, may include a position estimate generated by the UE. A means for receiving a response to the request from the UE sent by the UE using the uplink grant may include, e.g., the external interface 516 and one or more processors 502 with dedicated hardware or implementing executable code or software instructions in memory 504 and/or medium 520 in location server 500, such as the positioning session module 522, shown in FIG. 5.

In one implementation, the request for information related to the location services may be a request for periodic location information, wherein the message to instigate the uplink grant for the UE may include a message to instigate uplink grant repetitions to respond to the request for periodic location information. In one implementation, the location server may send a second message to a second base station to instigate uplink grant repetitions to respond to the request for periodic location information when the UE is handed off or performs a cell reselection to the second base station, e.g., as discussed at stage 7 of FIG. 2. A means for sending a second message to a second base station to instigate uplink grant repetitions to respond to the request for periodic location information when the UE is handed off to the second base station may include, e.g., the external interface 516 and one or more processors 502 with dedicated hardware or implementing executable code or software instructions in memory 504 and/or medium 520 in location server 500, such as the early uplink grant module 524, shown in FIG. 5.

In one implementation, the request for information related to the location services may be sent via Long Term Evolution (LTE) Positioning Protocol (LPP) and the response to the request may be received via LPP. In another implantation, the request for information related to the location services may be sent via Secure User Plane Location (SUPL) and the response to the request may be received via SUPL.

Figure 9:
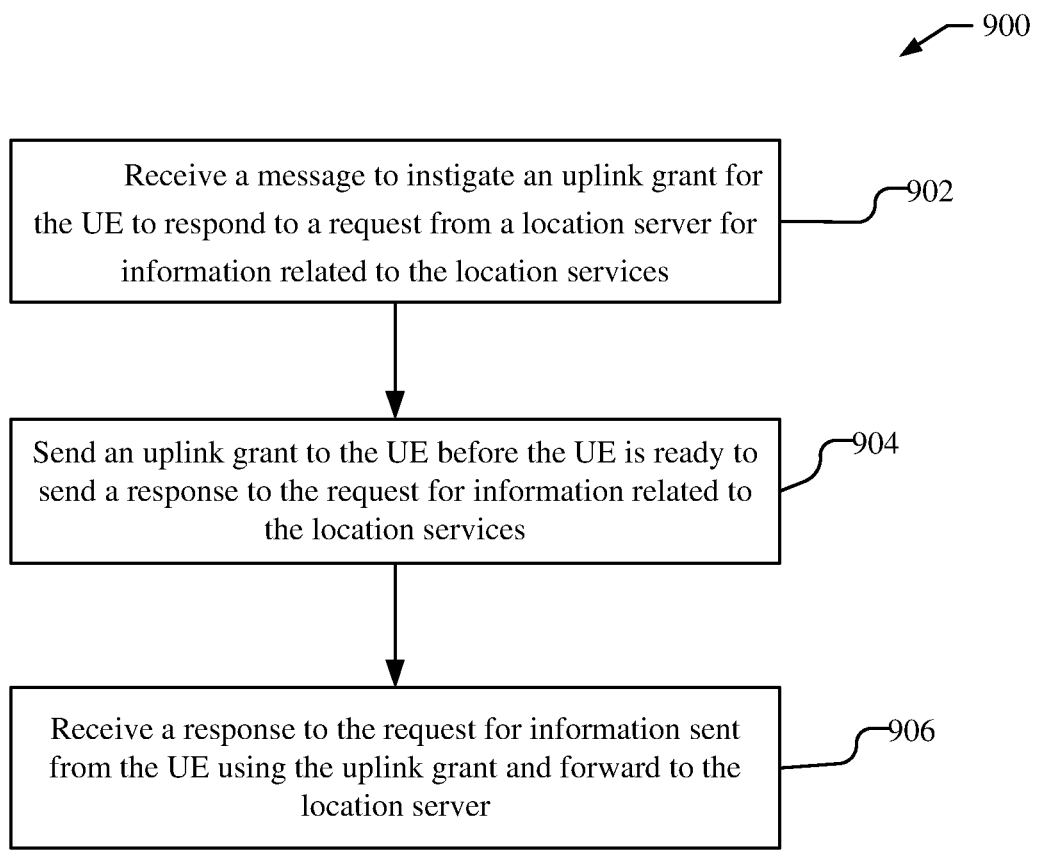
FIG. 9 shows a flowchart for an exemplary method for supporting location services for a UE using an early uplink grant that is performed by the base station.

FIG. 9 shows a flowchart for an exemplary method 900 for supporting location services for a user equipment (UE), such as the UE 102 shown in FIG. 1, performed by a base station, such as gNB 110 shown in FIG. 1, in a manner consistent with disclosed implementations.

At block 902, the base station receives a message to instigate an uplink grant for the UE to respond to a request from a location server (e.g. an LMF 152 or SLP 162) for information related to the location services, e.g., as discussed at stage 2 of FIG. 2 or stage 4 of FIG. 3. A means for receiving a message to instigate an uplink grant for the UE to respond to a request from a location server for information related to the location services may include, e.g., the wireless transceiver 610 or communications interface 616 and one or more processors 602 with dedicated hardware or implementing executable code or software instructions in memory 604 and/or medium 620 in base station 600, such as the early uplink grant request module 624, shown in FIG. 6.

At block 904, the base station sends an uplink grant to the UE before the UE is ready to send a response to the request for information related to the location services, e.g., as discussed at stage 3 of FIG. 2 or stage 5 of FIG. 3. The uplink grant may be sent to the UE before the UE has completed positioning measurements. A means for sending an uplink grant to the UE before the UE is ready to send a response to the request for information related to the location services may include, e.g., the wireless transceiver 610 and one or more processors 602 with dedicated hardware or implementing executable code or software instructions in memory 604 and/or medium 620 in base station 600, such as the early uplink grant transmit module 626, shown in FIG. 6.

At block 906, the base station receives a response to the request for information sent from the UE using the uplink grant and forwards to the location server, e.g., as discussed at stage 4 of FIG. 2 or stage 7 of FIG. 3. A means for receiving a response to the request for information sent from the UE using the uplink grant and forwarding to the location server may include, e.g., the wireless transceiver 610 and one or more processors 602 with dedicated hardware or implementing executable code or software instructions in memory 604 and/or medium 620 in base station 600, such as the positioning session module 622, shown in FIG. 6.

In one implementation, the request related to the location services may be a request for capabilities of the UE and the response to the request may be a capabilities response. In another implementation, the request for information related to the location services may be a request for location information and the response to the request may be the location information. The location information, for example, may include positioning measurements by the UE. The location information, for example, may include a position estimate generated by the UE.

In one implementation, the message to instigate the uplink grant for the UE may be received from the location server, e.g., as discussed at stage 2 of FIG. 2. For example, the message to instigate the uplink grant may be received in a New Radio Positioning Protocol A (NRPPa) message. The request for information related to the location services may be a request for periodic location information, wherein the message to instigate the uplink grant for the UE may be a message to instigate uplink grant repetitions, and the base station may send periodic uplink grants to the UE, e.g., as discussed at stages 3, 5, and 8 of FIG. 2 or stages 5 and 11 of FIG. 3; and may receive periodic location information sent from the UE using the uplink grant and forward the periodic location information to the location server, e.g., as discussed at stages 4, 6, and 9 of FIG. 2 or stages 7 and 13 of FIG. 3. A means for sending periodic uplink grants to the UE may include, e.g., the wireless transceiver 610 and one or more processors 602 with dedicated hardware or implementing executable code or software instructions in memory 604 and/or medium 620 in base station 600, such as the early uplink grant transmit module 626, shown in FIG. 6. A means for receiving periodic location information sent from the UE using the uplink grant and forwarding the periodic location information to the location server may include, e.g., the wireless transceiver 610 and one or more processors 602 with dedicated hardware or implementing executable code or software instructions in memory 604 and/or medium 620 in base station 600, such as the positioning session module 622, shown in FIG. 6.

In one implementation, the message to instigate the uplink grant for the UE may be a request for uplink grant received from the UE, e.g., as discussed at stage 4 of FIG. 3. For example, the request for uplink grant may be received in a Physical Layer message and the uplink grant may be sent in a Downlink Control Information (DCI) message. The base station may receive a request for early connection from the UE, e.g., as discussed at stage 3 of FIG. 3. A means for receiving a request for early connection from the UE may include, e.g., the wireless transceiver 610 and one or more processors 602 with dedicated hardware or implementing executable code or software instructions in memory 604 and/or medium 620 in base station 600, such as the early connection module 628, shown in FIG. 6. The request for location information may be a request for periodic location information, and the base station may receive a request for the uplink grant from the UE to respond to the request for periodic location information, e.g., as discussed at stage 4 of FIG. 3; send uplink grants to the UE before the UE is ready to send the response to the request for periodic location information, e.g., as discussed at stage 5 of FIG. 3; and receive the response to the request for periodic location information sent from the UE using the uplink grants and forwarding to the location serve, e.g., as discussed at stage 7 of FIG. 3. A means for receiving a request for the uplink grant from the UE to respond to the request for periodic location information may include, e.g., the wireless transceiver 610 and one or more processors 602 with dedicated hardware or implementing executable code or software instructions in memory 604 and/or medium 620 in base station 600, such as the early uplink grant request module 624, shown in FIG. 6. A means for sending uplink grants to the UE before the UE is ready to send the response to the request for periodic location information may include, e.g., the wireless transceiver 610 and one or more processors 602 with dedicated hardware or implementing executable code or software instructions in memory 604 and/or medium 620 in base station 600, such as the early uplink grant transmit module 626, shown in FIG. 6. A means for receiving the response to the request for periodic location information sent from the UE using the uplink grants and forwarding to the location server may include, e.g., the wireless transceiver 610 and one or more processors 602 with dedicated hardware or implementing executable code or software instructions in memory 604 and/or medium 620 in base station 600, such as the positioning session module 622, shown in FIG. 6.

In one implementation, the message to instigate the uplink grant for the UE may be an indication of an uplink grant received from a second base station, wherein the UE is handed off from the second base station to the base station.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In view of this description embodiments may include different combinations of features. Implementation examples are described in the following numbered clauses:

Clause 1. A method performed by a user equipment (UE) for supporting location services for the UE, comprising: receiving a request for location information from a location server; receiving an uplink grant from a base station before the UE is ready to send the location information to the location server; and sending the location information to the location server using the uplink grant.

Clause 2. The method of clause 1, wherein the uplink grant from the base station is received before the UE has completed positioning measurements.

Clause 3. The method of clause 2, wherein the location information comprises the positioning measurements.

Clause 4. The method of clause 2, further comprising determining a position estimate based on the positioning measurements, wherein the location information comprises the position estimate.

Clause 5. The method of any of clauses 1-4, wherein the request for location information comprises a request for periodic location information, the method further comprising: receiving periodic uplink grants from the base station in each period before the UE is ready to send periodic location information to the location server; and sending the periodic location information to the location server using the uplink grants.

Clause 6. The method of any of clauses 1-5, wherein the UE receives the uplink grant from the base station in response to a message sent from the location server to the base station to instigate the uplink grant for the UE.

Clause 7. The method of clause 6, wherein the request for location information comprises a request for periodic location information, the method further comprising: receiving an uplink grant from a second base station before the UE is ready to send periodic location information to the location server, wherein receiving the uplink grant is in response to either a second request for the uplink grant sent to the second base station from the location server or an indication of UL grants sent from the base station to the second base station during a handover of the UE from the base station to the second base station; and sending the periodic location information to the location server using the uplink grant.

Clause 8. The method of any of clauses 1-7, further comprising: sending a request for the uplink grant to the base station before the UE is ready to send the location information to the location server, wherein the UE receives the uplink grant from the base station in response to the request for the uplink grant.

Clause 9. The method of clause 8, further comprising: sending a request for early connection before the UE is ready to send the location information to the location server.

Clause 10. The method of clause 9, wherein the request for location information comprises a request for periodic location information, the method further comprising: sending a request for the uplink grant to the base station in each period before the UE is ready to send periodic location information to the location server; and sending the periodic location information to the location server using the uplink grants.

Clause 11. The method of any of clauses 1-10, wherein the request for location information is received via Long Term Evolution (LTE) Positioning Protocol (LPP) and the location information is sent via LPP.

Clause 12. The method of any of clauses 1-10, wherein the request for location information is received via Secure User Plane Location (SUPL) and the location information is sent via SUPL.

Clause 13. The method of any of clauses 1-12, wherein the uplink grant is received in Downlink Control Information (DCI) message.

Clause 14. A user equipment (UE) configured for supporting location services for the UE, comprising: a wireless transceiver configured to communicate with other entities in a wireless network; at least one memory; and at least one processor coupled to the wireless transceiver and the at least one memory and configured to: receive, via the wireless transceiver, a request for location information from a location server; receive, via the wireless transceiver, an uplink grant from a base station before the UE is ready to send the location information to the location server; and send, via the wireless transceiver, the location information to the location server using the uplink grant.

Clause 15. The UE of clause 14, wherein the uplink grant from the base station is received before the UE has completed positioning measurements.

Clause 16. The UE of clause 15, wherein the location information comprises the positioning measurements.

Clause 17. The UE of clause 15, wherein the at least one processor is further configured to determine a position estimate based on the positioning measurements, wherein the location information comprises the position estimate.

Clause 18. The UE of any of clauses 14-17, wherein the request for location information comprises a request for periodic location information, wherein the at least one processor is further configured to: receive, via the wireless transceiver, periodic uplink grants from the base station in each period before the UE is ready to send periodic location information to the location server; and send, via the wireless transceiver, the periodic location information to the location server using the uplink grants.

Clause 19. The UE of any of clauses 14-18, wherein the UE receives the uplink grant from the base station in response to a message sent from the location server to the base station to instigate the uplink grant for the UE.

Clause 20. The UE of clause 19, wherein the request for location information comprises a request for periodic location information, wherein the at least one processor is further configured to: receive, via the wireless transceiver, an uplink grant from a second base station before the UE is ready to send periodic location information to the location server in response to a second request for the uplink grant sent to the second base station from the location server; and send, via the wireless transceiver, the periodic location information to the location server using the uplink grant.

Clause 21. The UE of any of clauses 14-20, wherein the at least one processor is further configured to: send, via the wireless transceiver, a request for the uplink grant to the base station before the UE is ready to send the location information to the location server, wherein the UE receives the uplink grant from the base station in response to the request for the uplink grant.

Clause 22. The UE of clause 21, wherein the at least one processor is further configured to: send, via the wireless transceiver, a request for early connection before the UE is ready to send the location information to the location server.

Clause 23. The UE of clause 22, wherein the request for location information comprises a request for periodic location information, wherein the at least one processor is further configured to: send, via the wireless transceiver, a request for the uplink grant to the base station in each period before the UE is ready to send periodic location information to the location server; and send, via the wireless transceiver, the periodic location information to the location server using the uplink grants.

Clause 24. The UE of any of clauses 14-23, wherein the request for location information is received via Long Term Evolution (LTE) Positioning Protocol (LPP) and the location information is sent via LPP.

Clause 25. The UE of any of clauses 14-23, wherein the request for location information is received via Secure User Plane Location (SUPL) and the location information is sent via SUPL.

Clause 26. The UE of any of clauses 14-25, wherein the uplink grant is received in Downlink Control Information (DCI) message.

Clause 27. A user equipment (UE) configured for supporting location services for the UE, comprising: means for receiving a request for location information from a location server; means for receiving an uplink grant from a base station before the UE is ready to send the location information to the location server; and means for sending the location information to the location server using the uplink grant.

Clause 28. The UE of clause 27, wherein the uplink grant from the base station is received before the UE has completed positioning measurements.

Clause 29. The UE of clause 28, wherein the location information comprises the positioning measurements.

Clause 30. The UE of clause 28, further comprising means for determining a position estimate based on the positioning measurements, wherein the location information comprises the position estimate.

Clause 31. The UE of any of clauses 27-30, wherein the request for location information comprises a request for periodic location information, further comprising: means for receiving periodic uplink grants from the base station in each period before the UE is ready to send periodic location information to the location server; and means for sending the periodic location information to the location server using the uplink grants.

Clause 32. The UE of any of clauses 27-31, wherein the UE receives the uplink grant from the base station in response to a message sent from the location server to the base station to instigate the uplink grant for the UE.

Clause 33. The UE of clause 32, wherein the request for location information comprises a request for periodic location information, further comprising: means for receiving an uplink grant from a second base station before the UE is ready to send periodic location information to the location server, wherein receiving the uplink grant is in response to either a second request for the uplink grant sent to the second base station from the location server or an indication of UL grants sent from the base station to the second base station during a handover of the UE from the base station to the second base station; and means for sending the periodic location information to the location server using the uplink grant.

Clause 34. The UE of any of clauses 27-33, further comprising: means for sending a request for the uplink grant to the base station before the UE is ready to send the location information to the location server, wherein the UE receives the uplink grant from the base station in response to the request for the uplink grant.

Clause 35. The UE of clause 34, further comprising: means for sending a request for early connection before the UE is ready to send the location information to the location server.

Clause 36. The UE of clause 35, wherein the request for location information comprises a request for periodic location information, further comprising: means for sending a request for the uplink grant to the base station in each period before the UE is ready to send periodic location information to the location server; and means for sending the periodic location information to the location server using the uplink grants.

Clause 37. The UE of any of clauses 27-36, wherein the request for location information is received via Long Term Evolution (LTE) Positioning Protocol (LPP) and the location information is sent via LPP.

Clause 38. The UE of any of clauses 27-36, wherein the request for location information is received via Secure User Plane Location (SUPL) and the location information is sent via SUPL.

Clause 39. The UE of any of clauses 27-38, wherein the uplink grant is received in Downlink Control Information (DCI) message.

Clause 40. A non-transitory computer-readable storage medium including program code stored thereon, the program code is operable to configure at least one processor in a user equipment (UE) for supporting location services for the UE, the program code comprising instructions to: receive a request for location information from a location server; receive an uplink grant from a base station before the UE is ready to send the location information to the location server; and send the location information to the location server using the uplink grant.

Clause 41. The non-transitory computer-readable storage medium of clause 40, wherein the uplink grant from the base station is received before the UE has completed positioning measurements.

Clause 42. The non-transitory computer-readable storage medium of clause 41, wherein the location information comprises the positioning measurements.

Clause 43. The non-transitory computer-readable storage medium of clause 41, further comprising instructions to determine a position estimate based on the positioning measurements, wherein the location information comprises the position estimate.

Clause 44. The non-transitory computer-readable storage medium of any of clauses 40-43, wherein the request for location information comprises a request for periodic location information, the program code further comprising instructions to: receive periodic uplink grants from the base station in each period before the UE is ready to send periodic location information to the location server; and send the periodic location information to the location server using the uplink grants.

Clause 45. The non-transitory computer-readable storage medium of any of clauses 40-44, wherein the UE receives the uplink grant from the base station in response to a message sent from the location server to the base station to instigate the uplink grant for the UE.

Clause 46. The non-transitory computer-readable storage medium of clause 45, wherein the request for location information comprises a request for periodic location information, the program code further comprising instructions to: receive an uplink grant from a second base station before the UE is ready to send periodic location information to the location server, wherein receiving the uplink grant is in response to either a second request for the uplink grant sent to the second base station from the location server or an indication of UL grants sent from the base station to the second base station during a handover of the UE from the base station to the second base station; and send the periodic location information to the location server using the uplink grant.

Clause 47. The non-transitory computer-readable storage medium of any of clauses 40-46, the program code further comprising instructions to: send a request for the uplink grant to the base station before the UE is ready to send the location information to the location server, wherein the UE receives the uplink grant from the base station in response to the request for the uplink grant.

Clause 48. The non-transitory computer-readable storage medium of clause 47, the program code further comprising instructions to: send a request for early connection before the UE is ready to send the location information to the location server.

Clause 49. The -transitory computer-readable storage medium of clause 48, wherein the request for location information comprises a request for periodic location information, the program code further comprising instructions to: send a request for the uplink grant to the base station in each period before the UE is ready to send periodic location information to the location server; and send the periodic location information to the location server using the uplink grants.

Clause 50. The non-transitory computer-readable storage medium of any of clauses 40-49, wherein the request for location information is received via Long Term Evolution (LTE) Positioning Protocol (LPP) and the location information is sent via LPP.

Clause 51. The non-transitory computer-readable storage medium of any of clauses 40-49, wherein the request for location information is received via Secure User Plane Location (SUPL) and the location information is sent via SUPL.

Clause 52. The non-transitory computer-readable storage medium of any of clauses 40-51, wherein the uplink grant is received in Downlink Control Information (DCI) message.

Clause 53. A method performed by a location server for supporting location services for a user equipment (UE), comprising: sending a request to the UE for information related to the location services; sending a message to a base station to instigate an uplink grant for the UE to respond to the request; and receiving a response to the request from the UE sent by the UE using the uplink grant.

Clause 54. The method of clause 53, wherein the uplink grant from the base station is received by the UE before the UE is ready to send the response to the request.

Clause 55. The method of either of clauses 53 or 54, wherein the request related to the location services comprises a request for capabilities of the UE and the response to the request comprises a capabilities response.

Clause 56. The method of either of clauses 53 or 54, wherein the request for information related to the location services comprises a request for location information and the response to the request comprises the location information.

Clause 57. The method of clause 56, wherein the location information comprises positioning measurements by the UE.

Clause 58. The method of clause 56, wherein the location information comprises a position estimate generated by the UE.

Clause 59. The method of any of clauses 53-58, wherein the request for information related to the location services comprises a request for periodic location information, wherein the message to instigate the uplink grant for the UE comprises a message to instigate uplink grant repetitions to respond to the request for periodic location information.

Clause 60. The method of clause 59, the method further comprising: sending a second message to a second base station to instigate uplink grant repetitions to respond to the request for periodic location information when the UE is handed off or performs a cell reselection to the second base station.

Clause 61. The method of any of clauses 53-60, wherein the request for information related to the location services is sent via Long Term Evolution (LTE) Positioning Protocol (LPP) and the response to the request is received via LPP.

Clause 62. The method of any of clauses 53-60, wherein the request for information related to the location services is sent via Secure User Plane Location (SUPL) and the response to the request is received via SUPL.

Clause 63. The method of any of clauses 53-62, wherein the message to instigate the uplink grant is sent in a New Radio Positioning Protocol A message.

Clause 64. A location server configured for supporting location services for a user equipment (UE), comprising: an external interface configured to communicate with other entities in a wireless network; at least one memory; and at least one processor coupled to the external interface and the at least one memory and configured to: send, via the external interface, a request to the UE for information related to the location services; send, via the external interface, a message to a base station to instigate an uplink grant for the UE to respond to the request; and receive, via the external interface, a response to the request from the UE sent by the UE using the uplink grant.

Clause 65. The location server of clause 64, wherein the uplink grant from the base station is received by the UE before the UE is ready to send the response to the request.

Clause 66. The location server of either of clauses 64 or 65, wherein the request related to the location services comprises a request for capabilities of the UE and the response to the request comprises a capabilities response.

Clause 67. The location server of either of clauses 64 or 65, wherein the request for information related to the location services comprises a request for location information and the response to the request comprises the location information.

Clause 68. The location server of clause 67, wherein the location information comprises positioning measurements by the UE.

Clause 69. The location server of clause 67, wherein the location information comprises a position estimate generated by the UE.

Clause 70. The location server of any of clauses 64-69, wherein the request for information related to the location services comprises a request for periodic location information, wherein the message to instigate the uplink grant for the UE comprises a message to instigate uplink grant repetitions to respond to the request for periodic location information.

Clause 71. The location server of clause 70, the at least one processor further configured to: send, via the external interface, a second message to a second base station to instigate uplink grant repetitions to respond to the request for periodic location information when the UE is handed off or performs a cell reselection to the second base station.

Clause 72. The location server of any of clauses 64-71, wherein the request for information related to the location services is sent via Long Term Evolution (LTE) Positioning Protocol (LPP) and the response to the request is received via LPP.

Clause 73. The location server of any of clauses 64-71, wherein the request for information related to the location services is sent via Secure User Plane Location (SUPL) and the response to the request is received via SUPL.

Clause 74. The location server of any of clauses 64-73, wherein the message to instigate the uplink grant is sent in a New Radio Positioning Protocol A message.

Clause 75. A location server configured for supporting location services for a user equipment (UE), comprising: means for sending a request to the UE for information related to the location services; means for sending a message to a base station to instigate an uplink grant for the UE to respond to the request; and means for receiving a response to the request from the UE sent by the UE using the uplink grant.

Clause 76. The location server of clause 75, wherein the uplink grant from the base station is received by the UE before the UE is ready to send the response to the request.

Clause 77. The location server of either of clauses 75 or 76, wherein the request related to the location services comprises a request for capabilities of the UE and the response to the request comprises a capabilities response.

Clause 78. The location server of either of clauses 75 or 76, wherein the request for information related to the location services comprises a request for location information and the response to the request comprises the location information.

Clause 79. The location server of clause 78, wherein the location information comprises positioning measurements by the UE.

Clause 80. The location server of clause 78, wherein the location information comprises a position estimate generated by the UE.

Clause 81. The location server of any of clauses 75-80, wherein the request for information related to the location services comprises a request for periodic location information, wherein the message to instigate the uplink grant for the UE comprises a message to instigate uplink grant repetitions to respond to the request for periodic location information.

Clause 82. The location server of clause 81, further comprising: means for sending a second message to a second base station to instigate uplink grant repetitions to respond to the request for periodic location information when the UE is handed off or performs a cell reselection to the second base station.

Clause 83. The location server of any of clauses 75-82, wherein the request for information related to the location services is sent via Long Term Evolution (LTE) Positioning Protocol (LPP) and the response to the request is received via LPP.

Clause 84. The location server of any of clauses 75-82, wherein the request for information related to the location services is sent via Secure User Plane Location (SUPL) and the response to the request is received via SUPL.

Clause 85. The location server of any of clauses 75-84, wherein the message to instigate the uplink grant is sent in a New Radio Positioning Protocol A message.

Clause 86. A non-transitory computer-readable storage medium including program code stored thereon, the program code is operable to configure at least one processor in a location server for supporting location services for a user equipment (UE), the program code comprising instructions to: send a request to the UE for information related to the location services; send a message to a base station to instigate an uplink grant for the UE to respond to the request; and receive a response to the request from the UE sent by the UE using the uplink grant.

Clause 87. The non-transitory computer-readable storage medium of clause 86, wherein the uplink grant from the base station is received by the UE before the UE is ready to send the response to the request.

Clause 88. The non-transitory computer-readable storage medium of either of clauses 86 or 87, wherein the request related to the location services comprises a request for capabilities of the UE and the response to the request comprises a capabilities response.

Clause 89. The non-transitory computer-readable storage medium of either of clauses 86 or 87, wherein the request for information related to the location services comprises a request for location information and the response to the request comprises the location information.

Clause 90. The non-transitory computer-readable storage medium of clause 89, wherein the location information comprises positioning measurements by the UE.

Clause 91. The non-transitory computer-readable storage medium of clause 89, wherein the location information comprises a position estimate generated by the UE.

Clause 92. The non-transitory computer-readable storage medium of any of clauses 86-91, wherein the request for information related to the location services comprises a request for periodic location information, wherein the message to instigate the uplink grant for the UE comprises a message to instigate uplink grant repetitions to respond to the request for periodic location information.

Clause 93. The non-transitory computer-readable storage medium of clause 92, the program code further comprising instructions to: send a second message to a second base station to instigate uplink grant repetitions to respond to the request for periodic location information when the UE is handed off or performs a cell reselection to the second base station.

Clause 94. The non-transitory computer-readable storage medium of any of clauses 86-93, wherein the request for information related to the location services is sent via Long Term Evolution (LTE) Positioning Protocol (LPP) and the response to the request is received via LPP.

Clause 95. The non-transitory computer-readable storage medium of any of clauses 86-93, wherein the request for information related to the location services is sent via Secure User Plane Location (SUPL) and the response to the request is received via SUPL.

Clause 96. The non-transitory computer-readable storage medium of any of clauses 86-95, wherein the message to instigate the uplink grant is sent in a New Radio Positioning Protocol A message.

Clause 97. A method performed by a base station for supporting location services for a user equipment (UE), comprising: receiving a message to instigate an uplink grant for the UE to respond to a request from a location server for information related to the location services; sending an uplink grant to the UE before the UE is ready to send a response to the request for information related to the location services; and receiving a response to the request for information sent from the UE using the uplink grant and forward to the location server.

Clause 98. The method of clause 97, wherein the uplink grant is sent to the UE before the UE has completed positioning measurements.

Clause 99. The method of either of clauses 97 or 98, wherein the request related to the location services comprises a request for capabilities of the UE and the response to the request comprises a capabilities response.

Clause 100. The method of either of clauses 97 or 98, wherein the request for information related to the location services comprises a request for location information and the response to the request comprises the location information.

Clause 101. The method of clause 100, wherein the location information comprises positioning measurements by the UE.

Clause 102. The method of clause 100, wherein the location information comprises a position estimate generated by the UE.

Clause 103. The method of any of clauses 97-102, wherein the message to instigate the uplink grant for the UE is received from the location server.

Clause 104. The method of clause 103, wherein the request for information related to the location services comprises a request for periodic location information, wherein the message to instigate the uplink grant for the UE comprises a message to instigate uplink grant repetitions, the method further comprising: sending periodic uplink grants to the UE; receiving periodic location information sent from the UE using the uplink grant and forwarding the periodic location information to the location server.

Clause 105. The method of clause 103, wherein the message to instigate the uplink grant is received in a New Radio Positioning Protocol A message.

Clause 106. The method of any of clauses 97-105, wherein the message to instigate the uplink grant for the UE is a request for uplink grant received from the UE.

Clause 107. The method of clause 106, further comprising receiving a request for early connection from the UE.

Clause 108. The method of clause 106, wherein the request for location information comprises a request for periodic location information, the method further comprising: receiving a request for the uplink grant from the UE to respond to the request for periodic location information; sending uplink grants to the UE before the UE is ready to send the response to the request for periodic location information; and receiving the response to the request for periodic location information sent from the UE using the uplink grants and forwarding to the location server.

Clause 109. The method of any of clauses 106-108, wherein the request for uplink grant is received in a Physical Layer message and the uplink grant is sent in a Downlink Control Information (DCI) message.

Clause 110. The method of any of clauses 97-109, wherein the message to instigate the uplink grant for the UE is an indication of an uplink grant received from a second base station, wherein the UE is handed off from the second base station to the base station.

Clause 111. A base station configured for supporting location services for a user equipment (UE), comprising: an external interface configured to communicate with other entities in a wireless network; at least one memory; and at least one processor coupled to the external interface and the at least one memory and configured to: receive, via the external interface, a message to instigate an uplink grant for the UE to respond to a request from a location server for information related to the location services; send, via the external interface, an uplink grant to the UE before the UE is ready to send a response to the request for information related to the location services; and receive, via the external interface, a response to the request for information sent from the UE using the uplink grant and forward to the location server.

Clause 112. The base station of clause 111, wherein the uplink grant is sent to the UE before the UE has completed positioning measurements.

Clause 113. The base station of either of clauses 111 or 112, wherein the request related to the location services comprises a request for capabilities of the UE and the response to the request comprises a capabilities response.

Clause 114. The base station of either of clauses 111 or 112, wherein the request for information related to the location services comprises a request for location information and the response to the request comprises the location information.

Clause 115. The base station of clause 114, wherein the location information comprises positioning measurements by the UE.

Clause 116. The base station of clause 114, wherein the location information comprises a position estimate generated by the UE.

Clause 117. The base station of any of clauses 111-116, wherein the message to instigate the uplink grant for the UE is received from the location server.

Clause 118. The base station of clause 117, wherein the request for information related to the location services comprises a request for periodic location information, wherein the message to instigate the uplink grant for the UE comprises a message to instigate uplink grant repetitions, wherein the at least one processor is further configured to: send, via the external interface, periodic uplink grants to the UE; receive, via the external interface, periodic location information sent from the UE using the uplink grant and forwarding the periodic location information to the location server.

Clause 119. The base station of clause 117, wherein the message to instigate the uplink grant is received in a New Radio Positioning Protocol A message.

Clause 120. The base station of any of clauses 111-119, wherein the message to instigate the uplink grant for the UE is a request for uplink grant received from the UE.

Clause 121. The base station of clause 120, wherein the at least one processor is further configured to receive, via the external interface, a request for early connection from the UE.

Clause 122. The base station of clause 121, wherein the request for location information comprises a request for periodic location information, wherein the at least one processor is further configured to: receive, via the external interface, a request for the uplink grant from the UE to respond to the request for periodic location information; send, via the external interface, uplink grants to the UE before the UE is ready to send the response to the request for periodic location information; and receive, via the external interface, the response to the request for periodic location information sent from the UE using the uplink grants and forwarding to the location server.

Clause 123. The base station of any of clauses 120-122, wherein the request for uplink grant is received in a Physical Layer message and the uplink grant is sent in a Downlink Control Information (DCI) message.

Clause 124. The base station of any of clauses 111-123, wherein the message to instigate the uplink grant for the UE is an indication of an uplink grant received from a second base station, wherein the UE is handed off from the second base station to the base station.

Clause 125. A base station configured for supporting location services for a user equipment (UE), comprising: means for receiving a message to instigate an uplink grant for the UE to respond to a request from a location server for information related to the location services; means for sending an uplink grant to the UE before the UE is ready to send a response to the request for information related to the location services; and means for receiving a response to the request for information sent from the UE using the uplink grant and forward to the location server.

Clause 126. The base station of clause 125, wherein the uplink grant is sent to the UE before the UE has completed positioning measurements.

Clause 127. The base station of either of clauses 125 or 126, wherein the request related to the location services comprises a request for capabilities of the UE and the response to the request comprises a capabilities response.

Clause 128. The base station of either of clauses 125 or 126, wherein the request for information related to the location services comprises a request for location information and the response to the request comprises the location information.

Clause 129. The base station of clause 128, wherein the location information comprises positioning measurements by the UE.

Clause 130. The base station of clause 128, wherein the location information comprises a position estimate generated by the UE.

Clause 131. The base station of any of clauses 125-130, wherein the message to instigate the uplink grant for the UE is received from the location server.

Clause 132. The base station of clause 131, wherein the request for information related to the location services comprises a request for periodic location information, wherein the message to instigate the uplink grant for the UE comprises a message to instigate uplink grant repetitions, further comprising: means for sending periodic uplink grants to the UE; means for receiving periodic location information sent from the UE using the uplink grant and forwarding the periodic location information to the location server.

Clause 133. The base station of clause 131, wherein the message to instigate the uplink grant is received in a New Radio Positioning Protocol A message.

Clause 134. The base station of any of clauses 125-133, wherein the message to instigate the uplink grant for the UE is a request for uplink grant received from the UE.

Clause 135. The base station of clause 134, further comprising means for receiving a request for early connection from the UE.

Clause 136. The base station of clause 134, wherein the request for location information comprises a request for periodic location information, further comprising: means for receiving a request for the uplink grant from the UE to respond to the request for periodic location information; means for sending uplink grants to the UE before the UE is ready to send the response to the request for periodic location information; and means for receiving the response to the request for periodic location information sent from the UE using the uplink grants and forwarding to the location server.

Clause 137. The base station of any of clauses 134-136, wherein the request for uplink grant is received in a Physical Layer message and the uplink grant is sent in a Downlink Control Information (DCI) message.

Clause 138. The base station of any of clauses 125-137, wherein the message to instigate the uplink grant for the UE is an indication of an uplink grant received from a second base station, wherein the UE is handed off from the second base station to the base station.

Clause 139. A non-transitory computer-readable storage medium including program code stored thereon, the program code is operable to configure at least one processor in a base station for supporting location services for a user equipment (UE), the program code comprising instructions to: receive a message to instigate an uplink grant for the UE to respond to a request from a location server for information related to the location services; send an uplink grant to the UE before the UE is ready to send a response to the request for information related to the location services; and receive a response to the request for information sent from the UE using the uplink grant and forward to the location server.

Clause 140. The non-transitory computer-readable storage medium of clause 139, wherein the uplink grant is sent to the UE before the UE has completed positioning measurements.

Clause 141. The non-transitory computer-readable storage medium of either clauses 139 or 140, wherein the request related to the location services comprises a request for capabilities of the UE and the response to the request comprises a capabilities response.

Clause 142. The non-transitory computer-readable storage medium of either clauses 139 or 140, wherein the request for information related to the location services comprises a request for location information and the response to the request comprises the location information.

Clause 143. The non-transitory computer-readable storage medium of clause 142, wherein the location information comprises positioning measurements by the UE.

Clause 144. The non-transitory computer-readable storage medium of clause 142, wherein the location information comprises a position estimate generated by the UE.

Clause 145. The non-transitory computer-readable storage medium of any of clauses 139-144, wherein the message to instigate the uplink grant for the UE is received from the location server.

Clause 146. The non-transitory computer-readable storage medium of clause 145, wherein the request for information related to the location services comprises a request for periodic location information, wherein the message to instigate uplink grant for the UE comprises a message to instigate uplink grant repetitions, the program code further comprising instructions to: send periodic uplink grants to the UE; receive periodic location information sent from the UE using the uplink grant and forwarding the periodic location information to the location server.

Clause 147. The non-transitory computer-readable storage medium of clause 145, wherein the message to instigate the uplink grant is received in a New Radio Positioning Protocol A message.

Clause 148. The non-transitory computer-readable storage medium of any of clauses 139-147, wherein the message to instigate the uplink grant for the UE is a request for uplink grant received from the UE.

Clause 149. The non-transitory computer-readable storage medium of clause 148, the program code further comprising instructions to receive a request for early connection from the UE.

Clause 150. The non-transitory computer-readable storage medium of clause 148, wherein the request for location information comprises a request for periodic location information, the program code further comprising instructions to: receive a request for the uplink grant from the UE to respond to the request for periodic location information; send uplink grants to the UE before the UE is ready to send the response to the request for periodic location information; and receive the response to the request for periodic location information sent from the UE using the uplink grants and forwarding to the location server.

Clause 151. The non-transitory computer-readable storage medium of any of clauses 148-150, wherein the request for uplink grant is received in a Physical Layer message and the uplink grant is sent in a Downlink Control Information (DCI) message.

Clause 152. The non-transitory computer-readable storage medium of any of clauses 139-151, wherein the message to instigate the uplink grant for the UE is an indication of an uplink grant received from a second base station, wherein the UE is handed off from the second base station to the base station.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a user equipment (UE) for supporting location services for the UE, comprising:
    receiving a request for location information from a location server;
    receiving an uplink grant from a base station before the UE is ready to send the location information to the location server, wherein receiving the uplink grant from the base station is in response to a message sent from the location server to the base station to instigate the uplink grant for the UE; and
    sending the location information to the location server using the uplink grant.

2. The method of claim 1, wherein the uplink grant from the base station is received before the UE has completed positioning measurements.

3. The method of claim 2, wherein the location information comprises the positioning measurements.

4. The method of claim 2, further comprising determining a position estimate based on the positioning measurements, wherein the location information comprises the position estimate.

5. The method of claim 1, wherein the request for location information comprises a request for periodic location information, the method further comprising:
    receiving uplink grants from the base station in each period before the UE is ready to send periodic location information to the location server; and
    sending the periodic location information to the location server using the uplink grants.

6. The method of claim 1, wherein the request for location information comprises a request for periodic location information, the method further comprising:
    receiving a second uplink grant from a second base station before the UE is ready to send periodic location information to the location server, wherein receiving the second uplink grant is in response to either a second message sent to the second base station from the location server to instigate the second uplink grant for the UE or an indication of UL grants sent from the base station to the second base station during a handover of the UE from the base station to the second base station; and
    sending the periodic location information to the location server using the second uplink grant.

7. The method of claim 1, wherein the request for location information is received via Long Term Evolution (LTE) Positioning Protocol (LPP) and the location information is sent via LPP.

8. The method of claim 1, wherein the request for location information is received via Secure User Plane Location (SUPL) and the location information is sent via SUPL.

9. The method of claim 1, wherein the uplink grant is received in Downlink Control Information (DCI) message.

10. A user equipment (UE) configured for supporting location services for the UE, comprising:
    a wireless transceiver configured to communicate with other entities in a wireless network;
    at least one memory; and
    at least one processor coupled to the wireless transceiver and the at least one memory and configured to:
    receive, via the wireless transceiver, a request for location information from a location server;
    receive, via the wireless transceiver, an uplink grant from a base station before the UE is ready to send the location information to the location server, wherein the at least one processor is configured to receive the uplink grant from the base station in response to a message sent from the location server to the base station to instigate the uplink grant for the UE; and
    send, via the wireless transceiver, the location information to the location server using the uplink grant.

11. The UE of claim 10, wherein the uplink grant from the base station is received before the UE has completed positioning measurements.

12. The UE of claim 11, wherein the location information comprises the positioning measurements.

13. The UE of claim 11, wherein the at least one processor is further configured to determine a position estimate based on the positioning measurements, wherein the location information comprises the position estimate.

14. The UE of claim 10, wherein the request for location information comprises a request for periodic location information, wherein the at least one processor is further configured to:

receive, via the wireless transceiver, uplink grants from the base station in each period before the UE is ready to send periodic location information to the location server; and send, via the wireless transceiver, the periodic location information to the location server using the uplink grants.

15. The UE of claim 10, wherein the request for location information comprises a request for periodic location information, wherein the at least one processor is further configured to:

receive, via the wireless transceiver, a second uplink grant from a second base station before the UE is ready to send periodic location information to the location server, wherein the at least one processor is configured to receive the second uplink grant is in response to either a second message sent to the second base station from the location server to instigate the second uplink grant for the UE or an indication of UL grants sent from the base station to the second base station during a handover of the UE from the base station to the second base station; and send, via the wireless transceiver, the periodic location information to the location server using the second uplink grant.

16. The UE of claim 10, wherein the request for location information is received via Long Term Evolution (LTE) Positioning Protocol (LPP) and the location information is sent via LPP.

17. The UE of claim 10, wherein the request for location information is received via Secure User Plane Location (SUPL) and the location information is sent via SUPL.

18. The UE of claim 10, wherein the uplink grant is received in Downlink Control Information (DCI) message.

19. A method performed by a location server for supporting location services for a user equipment (UE), comprising:

sending a request to the UE for information related to the location services;

sending a message to a base station to instigate an uplink grant for the UE to respond to the request; and receiving a response to the request from the UE sent by the UE using the uplink grant.

20. The method of claim 19, wherein the uplink grant from the base station is received by the UE before the UE is ready to send the response to the request.

21. The method of claim 19, wherein the request related to the location services comprises a request for capabilities of the UE and the response to the request comprises a capabilities response.

22. The method of claim 19, wherein the request for information related to the location services comprises a request for location information and the response to the request comprises the location information.

23. The method of claim 22, wherein the location information comprises positioning measurements by the UE.

24. The method of claim 22, wherein the location information comprises a position estimate generated by the UE.

25. The method of claim 19, wherein the request for information related to the location services comprises a request for periodic location information, wherein the message to instigate the uplink grant for the UE comprises a message to instigate uplink grant repetitions to respond to the request for periodic location information.

26. The method of claim 25, the method further comprising:

sending a second message to a second base station to instigate uplink grant repetitions to respond to the request for periodic location information when the UE is handed off or performs a cell reselection to the second base station.

27. The method of claim 19, wherein the request for information related to the location services is sent via Long Term Evolution (LTE) Positioning Protocol (LPP) and the response to the request is received via LPP.

28. The method of claim 19, wherein the request for information related to the location services is sent via Secure User Plane Location (SUPL) and the response to the request is received via SUPL.

29. The method of claim 19, wherein the message to instigate the uplink grant is sent in a New Radio Positioning Protocol A message.

30. A method performed by a base station for supporting location services for a user equipment (UE), comprising:

receiving a message to instigate an uplink grant for the UE to respond to a request from a location server for information related to the location services, wherein the message to instigate the uplink grant for the UE is received from the location server;

sending an uplink grant to the UE before the UE is ready to send a response to the request for information related to the location services; and receiving a response to the request for information sent from the UE using the uplink grant and forward to the location server.

31. The method of claim 30, wherein the uplink grant is sent to the UE before the UE has completed positioning measurements.

32. The method of claim 30, wherein the request related to the location services comprises a request for capabilities of the UE and the response to the request comprises a capabilities response.

33. The method of claim 30, wherein the request for information related to the location services comprises a request for location information and the response to the request comprises the location information.

34. The method of claim 33, wherein the location information comprises positioning measurements by the UE.

35. The method of claim 33, wherein the location information comprises a position estimate generated by the UE.

36. The method of claim 30, wherein the request for information related to the location services comprises a request for periodic location information, wherein the message to instigate the uplink grant for the UE comprises a message to instigate uplink grant repetitions, the method further comprising:

sending uplink grants to the UE; and receiving periodic location information sent from the UE using the uplink grants and forwarding the periodic location information to the location server.

37. The method of claim 30, wherein the message to instigate the uplink grant is received in a New Radio Positioning Protocol A message.

38. The method of claim 30, wherein the message to instigate the uplink grant for the UE is an indication of a second uplink grant received from a second base station, wherein the UE is handed off from the second base station to the base station.

* * * * *